(12) United States Patent
Matsuno et al.

(10) Patent No.: US 10,559,812 B2
(45) Date of Patent: Feb. 11, 2020

(54) NEGATIVE ELECTRODE ACTIVE MATERIAL FOR NONAQUEOUS ELECTROLYTE SECONDARY BATTERY, NEGATIVE ELECTRODE FOR NONAQUEOUS ELECTROLYTE SECONDARY BATTERY, NONAQUEOUS ELECTROLYTE SECONDARY BATTERY, AND PRODUCTION METHOD OF NEGATIVE ELECTRODE ACTIVE MATERIAL FOR NONAQUEOUS ELECTROLYTE SECONDARY BATTERY

(71) Applicant: SHIN-ETSU CHEMICAL CO., LTD., Tokyo (JP)

(72) Inventors: Takumi Matsuno, Annaka (JP); Takakazu Hirose, Annaka (JP); Kohta Takahashi, Takasaki (JP); Masahiro Furuya, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 89 days.

(21) Appl. No.: 16/063,016

(22) PCT Filed: Dec. 16, 2016

(86) PCT No.: PCT/JP2016/005149
§ 371 (c)(1),
(2) Date: Jun. 15, 2018

(87) PCT Pub. No.: WO2017/119032
PCT Pub. Date: Jul. 13, 2017

(65) Prior Publication Data
US 2019/0006656 A1    Jan. 3, 2019

(30) Foreign Application Priority Data

Jan. 4, 2016   (JP) .................. 2016-000287

(51) Int. Cl.
*H01M 4/133*      (2010.01)
*H01M 4/485*      (2010.01)
(Continued)

(52) U.S. Cl.
CPC .......... *H01M 4/133* (2013.01); *C01B 33/113* (2013.01); *H01M 4/134* (2013.01); *H01M 4/366* (2013.01);
(Continued)

(58) Field of Classification Search
CPC .......... H01M 10/052; H01M 10/0525; H01M 4/133; H01M 4/134; H01M 4/366; H01M 4/386; H01M 4/483; H01M 4/485
See application file for complete search history.

(56) References Cited

U.S. PATENT DOCUMENTS

| 5,395,711 A | 3/1995 | Tahara et al. |
| 2001/0012503 A1 | 8/2001 | Fukuoka et al. |

(Continued)

FOREIGN PATENT DOCUMENTS

| JP | 2997741 B2 | 1/2000 |
| JP | 2001-185127 A | 7/2001 |

(Continued)

OTHER PUBLICATIONS

Mar. 14, 2017 Search Report issued in International Patent Application No. PCT/JP2016/005149.

*Primary Examiner* — Carlos Barcena
(74) *Attorney, Agent, or Firm* — Oliff PLC

(57) ABSTRACT

A negative electrode active material for nonaqueous electrolyte secondary batteries including: a particle of negative electrode active material, wherein the particle of negative electrode active material contains a particle of silicon compound containing a silicon compound ($SiO_x$: $0.5 \le x \le 1.6$), on at least a part of a surface of the silicon compound a carbon (Continued)

coating film being formed, and the negative electrode active material contains 2% by mass or less of particle of silicon dioxide and the negative electrode active material contains a silicon dioxide-carbon composite secondary particle containing a plurality of the particles of silicon dioxide and carbon. As a result, the negative electrode active material for nonaqueous electrolyte secondary batteries capable of increasing battery capacity and improving the cycle characteristics and battery initial efficiency is provided.

20 Claims, 3 Drawing Sheets

(51) Int. Cl.
H01M 4/36 (2006.01)
H01M 4/38 (2006.01)
H01M 4/48 (2010.01)
H01M 10/052 (2010.01)
C01B 33/113 (2006.01)
H01M 10/0525 (2010.01)
H01M 4/134 (2010.01)

(52) U.S. Cl.
CPC ......... H01M 4/386 (2013.01); H01M 4/483 (2013.01); H01M 4/485 (2013.01); H01M 10/052 (2013.01); H01M 10/0525 (2013.01)

(56) References Cited

U.S. PATENT DOCUMENTS

| | | | |
|---|---|---|---|
| 2003/0118905 A1* | 6/2003 | Fukuoka | C09C 1/3045 |
| | | | 429/218.1 |
| 2006/0068287 A1* | 3/2006 | Morita | H01M 4/134 |
| | | | 429/223 |
| 2006/0083987 A1 | 4/2006 | Konishiike et al. | |
| 2006/0099507 A1 | 5/2006 | Kogetsu et al. | |
| 2008/0176137 A1 | 7/2008 | Endo et al. | |
| 2009/0075173 A1 | 3/2009 | Jeong et al. | |
| 2009/0202911 A1 | 8/2009 | Fukuoka et al. | |
| 2015/0010696 A1 | 1/2015 | Yakovleva et al. | |
| 2017/0149050 A1 | 5/2017 | Hirose et al. | |

FOREIGN PATENT DOCUMENTS

| | | |
|---|---|---|
| JP | 2002-042806 A | 2/2002 |
| JP | 2004-063433 A | 2/2004 |
| JP | 2006-114454 A | 4/2006 |
| JP | 2006-164954 A | 6/2006 |
| JP | 3865033 B2 | 1/2007 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-513206 A | 4/2013 |
| WO | 2015/198511 A1 | 12/2015 |

* cited by examiner

NEGATIVE ELECTRODE ACTIVE MATERIAL FOR NONAQUEOUS ELECTROLYTE SECONDARY BATTERY, NEGATIVE ELECTRODE FOR NONAQUEOUS ELECTROLYTE SECONDARY BATTERY, NONAQUEOUS ELECTROLYTE SECONDARY BATTERY, AND PRODUCTION METHOD OF NEGATIVE ELECTRODE ACTIVE MATERIAL FOR NONAQUEOUS ELECTROLYTE SECONDARY BATTERY

TECHNICAL FIELD

The present invention relates to a negative electrode active material for nonaqueous electrolyte secondary batteries, a negative electrode for nonaqueous electrolyte secondary batteries, a nonaqueous electrolyte secondary battery, and a production method of a negative electrode active material for nonaqueous electrolyte secondary batteries.

BACKGROUND ART

In recent years, small-sized electronic devices represented by mobile terminals and the like have been widely spread and further down-sizing, weight saving and longer life are strongly demanded. To a market demand like this, developments of secondary batteries capable of obtaining, in particular, a smaller size, a lighter weight and a higher energy density have been forwarded. The secondary batteries have been studied to apply also to large-sized electronic devices represented by automobiles and power-storage systems represented by houses or the like without limiting to small-sized electronic devices.

Among these, a lithium ion secondary battery is highly expected because smaller size and higher capacity are easy to obtain and the energy density higher than that of a lead battery or a nickel-cadmium battery can be obtained.

The lithium ion secondary battery includes a positive electrode, a negative electrode, a separator, and an electrolytic solution. The negative electrode includes a negative electrode active material related to a charge/discharge reaction.

As the negative electrode active material, while a carbon-based active material is widely used, a further improvement in a battery capacity is demanded from recent market demand. As a factor for improving the battery capacity, it has been studied to use silicon as the negative electrode active material. This is because the silicon has a theoretical capacity (4199 mAh/g) of 10 times or more a theoretical capacity of graphite (372 mAh/g), and a great improvement in the battery capacity can be expected. A development of a silicon material as the negative electrode active material includes studies on not only a silicon simple substance but also on compounds represented by alloys, oxides or the like. Shapes of the active material have been studied from a standard coating type in a carbon material to an integrated type directly deposited on a current collector.

However, when the silicon is used as a main raw material as the negative electrode active material, since a particle of negative electrode active material expands and contracts during charge/discharge, cracks are likely to occur mainly in the neighborhood of a superficial layer of the particles of negative electrode active material. Furthermore, an ionic substance is generated inside the active material, and the particles of negative electrode active material are likely to be cracked. When the superficial layer of the negative electrode active material is cracked, a new surface is generated thereby, and a reaction area of the active material increases. At this time, the electrolytic solution is consumed since a decomposition reaction of an electrolytic solution occurs on the new surface and a film that is a decomposition product of the electrolytic solution is formed on the new surface. Therefore, the cycle characteristics become easily degraded.

Until now, in order to improve an initial efficiency and cycle characteristics of a battery, negative electrode materials for lithium ion secondary batteries having the silicon material as a main material and electrode structures thereof have been variously studied.

Specifically, in order to obtain excellent cycle characteristics and high safety, silicon and amorphous silicon dioxide are simultaneously deposited by using a vapor phase method (see, for example, Patent Document 1 below). Furthermore, in order to obtain high battery capacity and safety, a carbon material (an electronically conductive material) is provided on a superficial layer of particles of silicon oxide (see, for example, Patent Document 2 below). Furthermore, in order to improve the cycle characteristics and to obtain high input/output characteristics, an active material containing silicon and oxygen is prepared and an active material layer having a high oxygen ratio in the neighborhood of a current collector is formed (see, for example, Patent Document 3 below). Still furthermore, in order to improve the cycle characteristics, oxygen is contained in a silicon active material such that an average oxygen content is 40 at % or less (at % expresses an atomic composition percentage), and an oxygen content is high in a place close to a current collector (see, for example, Patent Document 4 below).

Furthermore, in order to improve a first time charge/discharge efficiency, a nano composite containing a Si phase, $SiO_2$ and $M_yO$ metal oxide is used (see, for example, Patent Document 5, below). Still furthermore, in order to improve the first time charge/discharge efficiency, a Li-containing substance is added to the negative electrode, and pre-doping where the Li-containing substance is decomposed at a place where a negative electrode potential is high to return the Li to a positive electrode, is performed (see, for example, Patent Document 6 below).

Furthermore, in order to improve the cycle characteristics, $SiO_x$ ($0.8 \leq x \leq 1.5$, a particle size range=1 μm to 50 μm) and a carbon material are mixed and sintered at a high temperature (see, for example, Patent Document 7, below). Furthermore, in order to improve the cycle characteristics, an active material is controlled in the range such that a molar ratio of oxygen to silicon in a negative electrode active material is from 0.1 to 1.2, and, a difference of the maximum value and the minimum value of the molar ratio of an oxygen amount to a silicon amount in the neighborhood of an interface of the active material and a current collector is 0.4 or less (see, for example, Patent Document 8, below). Furthermore, in order to improve the cycle characteristics, a hydrophobic layer such as a silane compound is formed on a superficial layer of a silicon material (see, for example, Patent Document 9, below). Still furthermore, in order to improve the cycle characteristics, silicon oxide is used, and a graphite film is formed on a superficial layer thereof to impart electric conductivity (see, for example, Patent Document 10, below). In the Patent Document 10, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5 < I_{1330}/I_{1580} < 3$.

Furthermore, in order to improve the cycle characteristics, silicon oxide is used, and a graphite film is formed on a superficial layer thereof to impart the electric conductivity (see, for example, Patent Document 11, below). In this case, regarding a shift value obtained from a Raman spectrum of the graphite film, broad peaks appear at 1330 cm$^{-1}$ and 1580 cm$^{-1}$, and an intensity ratio thereof $I_{1330}/I_{1580}$ is $1.5<I_{1330}/I_{1580}<3$.

Furthermore, in order to obtain high battery capacity and to improve cycle characteristics, particles having a silicon crystallite phase dispersed in silicon dioxide are used (see, for example, Patent Document 12, below). Still furthermore, in order to improve overcharge and overdischarge characteristics, silicon oxide in which an atomic ratio of silicon and oxygen is controlled to 1:y (0<y<2) is used (see, for example, Patent Document 13, below).

The silicon oxide used as a negative electrode material for secondary batteries like this can be produced according to a method where a silicon powder and a silicon dioxide powder that are raw materials are supplied into a reaction furnace, and are heated under inert gas or under reduced pressure to generate silicon oxide gas, and the silicon oxide gas is cooled to deposit on a surface of a substrate (see, for example, Patent Document 14, below).

CITATION LIST

Patent Literature

Patent Document 1: JP 2001-185127 A
Patent Document 2: JP 2002-042806 A
Patent Document 3: JP 2006-164954 A
Patent Document 4: JP 2006-114454 A
Patent Document 5: JP 2009-070825 A
Patent Document 6: JP 2013-513206 W
Patent Document 7: JP 2008-282819 A
Patent Document 8: JP 2008-251369 A
Patent Document 9: JP 2008-177346 A
Patent Document 10: JP 2007-234255 A
Patent Document 11: JP 2009-212074 A
Patent Document 12: JP 2009-205950 A
Patent Document 13: JP 2997741 B1
Patent Document 14: JP 3865033 B1

SUMMARY OF INVENTION

Technical Problem

As was described above, in recent years, higher performance and multi-functionalization of small-sized mobile devices typical in the electronic devices have been forwarded, and a nonaqueous electrolyte secondary battery, in particular, a lithium ion secondary battery that is a main power source thereof is required to have an increased battery capacity. As one measure to solve the problem, a development of nonaqueous electrolyte secondary batteries that use a silicon material having a large theoretical capacity as a main material has been forwarded. However, the cycle characteristics close to the same as a nonaqueous electrolyte secondary battery that uses a carbon material have not been obtained, further improvement is demanded.

Furthermore, according to the production method of silicon oxide described in Patent Document 14, a part of a silicon dioxide powder that is a raw material moves also toward a cooling chamber side accompanying a flow of silicon oxide gas from an inside of the reaction furnace to the cooling chamber to mingle with a precipitate of the silicon oxide. Therefore, when the silicon oxide is used as a negative electrode material of a secondary battery, there is a problem that the battery performance is degraded due to inclusion of electrically nonconductive silicon dioxide.

The present invention was performed in view of the above problems, and it is an object of the present invention to provide a negative electrode active material for nonaqueous electrolyte secondary batteries capable of increasing battery capacity and improving the cycle characteristics and battery initial efficiency. Furthermore, it is an object of the present invention to provide a negative electrode for nonaqueous electrolyte secondary batteries that use the negative electrode active material, and a nonaqueous electrolyte secondary battery that uses the negative electrode. Still furthermore, it is an object of the present invention to provide a production method of particle of negative electrode active material for nonaqueous electrolyte secondary battery that can be used in the negative electrode like this.

Solution to Problem

In order to achieve the above object, the present invention provides a negative electrode active material for nonaqueous electrolyte secondary batteries comprising: a particle of negative electrode active material, wherein the particle of negative electrode active material contains particle of silicon compound containing a silicon compound ($SiO_x$:$0.5 \leq x \leq 1.6$), on at least a part of a surface of the silicon compound a carbon coating film being formed, and the negative electrode active material contains 2% by mass or less of particle of silicon dioxide, and the negative electrode active material contains a silicon dioxide-carbon composite secondary particle containing a plurality of the particles of the silicon dioxide and carbon.

Thus, the negative electrode active material of the present invention has high battery capacity because the particle of negative electrode active material (also called as particle of silicon-based active material) containing the particle of silicon compound containing a silicon compound are contained. Furthermore, the battery retention rate and first time efficiency can be improved because of appropriate electrical conductivity due to inclusion of a carbon coating film. Furthermore, the battery performance can be suppressed from degrading due to mixing of silicon dioxide during production because the particles of silicon dioxide are contained as the silicon dioxide-carbon composite secondary particle (called also as composite secondary particle) having electronic conductivity.

At this time, it is preferable that the composite secondary particle contains the particle of silicon compound.

Thus, local fluctuation of capacity and potential during battery charge/discharge can be suppressed because the composite secondary particle includes the particle of silicon compound having battery capacity.

At this time, it is preferable that the composite secondary particle has an average particle diameter of 1 μm or more and 15 μm or less.

When the average particle diameter of composite secondary particle is 1 μm or more, a reaction with an electrolytic solution on a surface of the composite secondary particle can be suppressed to a slight amount because a specific surface area thereof is not so much large. Furthermore, when the average particle diameter of the composite secondary particle is 15 μm or less, excellent electric conductivity may be obtained because of an appropriate contact area with the particle of negative electrode active material.

At this time, it is preferable that a major diameter L and a minor diameter D of the composite secondary particle satisfy a relationship of $1 \leq L/D \leq 5$.

When the major diameter L and minor diameter D of the composite secondary particle are within the above range, excellent electric conductivity can be obtained because the composite secondary particle is likely to be contained between the particles of negative electrode active material, and have an appropriate contact area with the particle of negative electrode active material.

Furthermore, at this time, it is preferable that at least a part of the particles of silicon dioxide which constitute the composite secondary particle is substantially spherical.

When the particles of silicon dioxide are spherical like this, excellent electric conductivity can be obtained while suppressing a reaction with an electrolytic solution, because a large contact area may be obtained with the particle of negative electrode active material while maintaining the composite secondary particle at an appropriate specific surface area.

At this time, it is preferable that a ratio of carbon relative to an entirety of the composite secondary particle is 60 at % or more.

When a percentage content of carbon is in the above described range, the electronic conductivity of the composite secondary particle can be improved.

At this time, it is preferable that a coverage of carbon on a surface of the composite secondary particle is 30% or more, and an average film thickness is 30 nm or more.

Thus, when the coverage of the carbon on a surface of the composite secondary particle is 30% or more, the electric conductivity may be improved because probability of contact not with silicon dioxide but with carbon increases on a contact surface between the composite secondary particle and the particle of negative electrode active material. Furthermore, when an average film thickness is 30 nm or more, excellent electronic conductivity may be obtained.

At this time, it is preferable that the composite secondary particle is 2% by mass or less relative to a total mass of the negative electrode active material.

When a percentage content of the composite secondary particle is in the above described range, a negative electrode active material having larger capacity can be obtained because the composite secondary particle having small capacity is contained at a slight amount.

At this time, a carbon coating film formed on a particle surface of silicon compound has scattering peaks at 1330 $cm^{-1}$ and 1580 $cm^{-1}$ in a Raman spectrum analysis, and an intensity ratio thereof $I_{1330}/I_{1580}$ satisfies a relationship of $0.7<I_{1330}/I_{1580}<2.0$.

When the intensity ratio $I_{1330}/I_{1580}$ like this is satisfied, the battery characteristics such as the capacity retention rate and first time efficiency can be improved because a ratio of a carbon material having a diamond structure and a carbon material having a graphite structure contained in the carbon coating film can be optimized.

At this time, it is preferable that in the carbon coating film, a fragment of a $C_yH_z$-based compound is detected by a TOF-SIMS (time-of-flight secondary ion mass spectrometry), and as the fragment of the $C_yH_z$-based compound, one in which "y" and "z" satisfy the range of $6 \geq y \geq 2$ and $2y+2 \geq z \geq 2y-2$ is detected in at least a part of the carbon coating film.

In a surface state where the fragment of the $C_yH_z$-based compound like this is detected, compatibility between the negative electrode active material and a binder becomes excellent, resultantly, the battery characteristics can be further improved.

At this time, it is preferable that the carbon coating film has a weight average molecular weight measured by a gel permeation chromatography using a polystyrene standard of 400 or more and 5000 or less, and contains a carbon-based compound soluble in a hydrocarbon solvent, and has a content of the carbon-based compound of 2 mass ppm or more and 6000 mass ppm or less relative to a total mass of the particle of the silicon compound.

When the carbon coating film contains the carbon-based compound like this, a negative electrode active material capable of obtaining high charge/discharge capacity and excellent cycle characteristics is obtained because the electrolytic solution is suppressed from being decomposed without damaging the electric conductivity.

At this time, it is preferable that a percentage content of the carbon coating film is 2% by mass or more and 20% by mass or less relative to a total mass of the particle of silicon compound and the carbon coating film.

When the carbon coating film is contained at a ratio like this, the silicon compound having high capacity may be contained at an appropriate ratio and sufficient battery capacity can be secured.

At this time, it is preferable that the negative electrode active material of the present invention has a relationship between an intensity (Ia) of a peak in the vicinity of $2\theta=21.8°$ and an intensity (Ib) of a peak in the vicinity of $2\theta=28.4°$ in an X-ray diffraction spectrum of $0.8 \leq Ib/Ia \leq 4.0$.

When the peak intensity ratio of the X-ray diffraction spectrum like this is satisfied, the negative electrode active material combining proper strength, stability and electronic conductivity can be obtained.

Furthermore, at this time, it is preferable that the particle of silicon compound has a half value width ($2\theta$) of a diffraction peak attributable to a Si (111) crystal plane obtained by X-ray diffractometry of 1.2° or more and a crystallite size corresponding to the crystal plane of 7.5 nm or less.

The silicon compound having the half value width and crystallite size like this has low crystallinity. The battery characteristics of the negative electrode active material can be improved by using particle of silicon compound that has low crystallinity and contains a slight amount of Si crystals.

At this time, it is preferable that a median diameter of the particle of silicon compound is 0.5 μm or more and 20 μm or less.

When the negative electrode active material contains the particle of silicon compound having the median diameter like this, the capacity retention rate may be improved.

Furthermore, the present invention provides a negative electrode for nonaqueous electrolyte secondary batteries comprising: the negative electrode active material for nonaqueous electrolyte secondary batteries; and a carbon-based active material.

The negative electrode for nonaqueous electrolyte secondary batteries like this can improve the first time efficiency and capacity retention rate while increasing the capacity of the negative electrode.

At this time, it is preferable that a ratio of the particle of silicon compound relative to a sum total of the carbon-based active material and the particle of the silicon compound is 4% by mass or more.

The negative electrode like this can improve a volume energy density of the battery.

Furthermore, the present invention provides a nonaqueous electrolyte secondary battery, wherein the nonaqueous electrolyte secondary battery uses the negative electrode for nonaqueous electrolyte secondary battery.

The nonaqueous electrolyte secondary battery using the negative electrode of the present invention has high capacity and excellent cycle characteristics and first time efficiency.

Furthermore, the present invention provides a production method of a negative electrode active material for nonaqueous electrolyte secondary batteries containing particle of negative electrode active material, the production method comprising: producing a negative electrode active material, the producing a negative electrode active material including preparing the particle of silicon compound containing a silicon compound expressed by a general formula ($SiO_x$: $0.5 \leq x \leq 1.6$), coating at least a part of a surface of the particle of silicon compound with a carbon coating film, and forming a silicon dioxide-carbon composite secondary particle containing a plurality of silicon dioxide particles and carbon; and selecting negative electrode active material that contains 2% by mass or less of the particle of silicon dioxide and the silicon dioxide-carbon composite secondary particle from the produced negative electrode active material.

According to the production method of a negative electrode active material having the steps like this, the negative electrode active material for nonaqueous electrolyte secondary batteries of the present invention capable of increasing the battery capacity and capable of improving the cycle characteristics and battery initial efficiency, can be stably obtained.

At this time, it is preferable that the step of coating at least a part of a surface of the particle of silicon compound with a carbon coating film and the step of forming the silicon-dioxide-carbon-composite secondary particle are carried out in a continuous furnace, and the continuous furnace is a rotary kiln that heats/decomposes a carbon source gas while mixing/stirring the negative electrode active material in the inside by rotation of a furnace tube.

When these steps are carried out in the continuous furnace, the negative electrode active material can be obtained efficiently and at a low cost. Furthermore, when the rotary kiln is used as the continuous furnace, mixing/stirring are accelerated, and more homogeneous negative electrode active material can be obtained.

Advantageous Effects of Invention

As described above, the negative electrode active material for nonaqueous electrolyte secondary batteries of the present invention can improve the capacity retention rate and first time efficiency because the particle of negative electrode active material contains a carbon coating film and have appropriate electric conductivity thereby. Furthermore, degradation of the battery performance due to mixing of silicon dioxide during production can be suppressed because the particle of silicon dioxide is contained as the silicon dioxide-carbon composite secondary particle having electronic conductivity. Still furthermore, the similar effect is obtained also in the negative electrode and nonaqueous electrolyte secondary batteries containing the negative electrode active material. Furthermore, the negative electrode active material can be stably obtained by the production method of the negative electrode active material for nonaqueous electrolyte secondary batteries of the present invention.

DESCRIPTION OF EMBODIMENTS

Hereinafter, the present invention will be described with reference to the drawings. However, the present invention is not limited thereto.

As described above, as one of methods for increasing the battery capacity of the nonaqueous electrolyte secondary battery, it has been studied to use a negative electrode that uses a silicon material as a main material as a negative electrode of nonaqueous electrolyte secondary batteries.

The nonaqueous electrolyte secondary battery that uses the silicon material is desired to have the cycle characteristics and safety close to the same as the nonaqueous electrolyte secondary battery that uses the carbon material. However, a negative electrode material that shows the cycle stability and safety equivalent with the nonaqueous electrolyte secondary battery that uses the carbon material has not been proposed. Furthermore, since a silicon compound containing particularly oxygen has the first time efficiency lower than the carbon material, an improvement in the battery capacity was limitative for that part. Still furthermore, when silicon oxide is used as a negative electrode material of the secondary battery, there was a problem that the battery performance is degraded due to nonconductive silicon dioxide that mingles during production.

Accordingly, the present inventors have conducted intensive studies of a negative electrode active material capable of obtaining excellent first time efficiency and excellent cycle characteristics when used in the negative electrode of nonaqueous electrolyte secondary batteries. As a result, it was found that if, in a negative electrode active material for nonaqueous electrolyte secondary batteries containing particle of negative electrode active material, the particle of negative electrode active material contains particle of silicon compound containing a silicon compound ($SiO_x$: $0.5 \leq x \leq 1.6$), at least on a part of a surface of the silicon compound a carbon coating film being formed, and the negative electrode active material contains 2% by mass or less of the particle of silicon dioxide and the negative electrode active material contains a silicon dioxide-carbon composite secondary particle containing a plurality of the particles of silicon dioxide and carbon, when the negative electrode active material is used as an active material of the nonaqueous electrolyte secondary battery, high battery capacitance and excellent cycle characteristics and excellent initial charge/discharge capacity can be obtained, thereby bringing the present invention to completion.

(1. Negative Electrode for Nonaqueous Electrolyte Secondary Battery)

Figure 1:
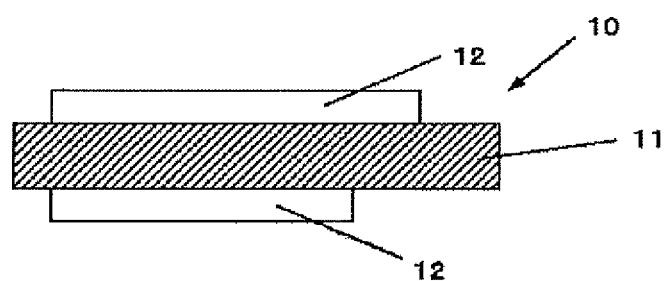
FIG. 1 is a cross-sectional diagram showing one example of a structure of a negative electrode for nonaqueous electrolyte secondary batteries of the present invention.

A negative electrode for nonaqueous electrolyte secondary batteries, which uses the negative electrode active material for nonaqueous electrolyte secondary batteries of the present invention will be described. FIG. 1 shows a cross-sectional structure of a negative electrode for nonaqueous electrolyte secondary batteries (hereinafter, referred to simply as "negative electrode" in some cases) in one embodiment of the present invention.

(Structure of Negative Electrode)

As shown in FIG. 1, a negative electrode 10 is configured to have a negative electrode active material layer 12 on a negative electrode current collector 11. The negative electrode active material layer 12 may be formed on both surfaces or only on one surface of the negative electrode current collector 11. Furthermore, if a negative electrode active material of the present invention is used, the negative electrode current collector 11 may not be used.

(Negative Electrode Current Collector)

The negative electrode current collector 11 is configured of a substance that is an excellent electrically conductive material and has excellent mechanical strength. As the electrically conductive materials that can be used for the negative electrode current collector 11, for example, copper (Cu) or nickel (Ni) can be used. It is preferable that the electrically conductive material does not form an intermetallic compound with lithium (Li).

It is preferable that the negative electrode current collector 11 contains carbon (C) or sulfur (S) other than a main element. This is because the physical strength of the negative electrode current collector is improved. In particular, in the case where an active material layer that expands during charge is included, deformation of the electrode including the current collector is suppressed when the current collector includes the above described elements. Although contents of the elements are not particularly limited, among these, each is preferably 100 mass ppm or less. This is because higher deformation suppression effect is obtained.

A surface of the negative electrode current collector 11 may be roughened or may not be roughened. The roughened negative electrode current collector is a metal foil treated by, for example, an electrolytic treatment, an embossing treatment, or a chemical etching treatment. The negative electrode current collector that is not roughened is, for example, a rolled metal foil.

(Negative Electrode Active Material Layer)

The negative electrode active material layer 12 contains a plurality of particles of negative electrode active material capable of absorbing/releasing lithium ions, and, from the viewpoint of battery design, may further contain other materials such as a negative electrode binder or a conductive assistant. The negative electrode active material for nonaqueous electrolyte secondary batteries of the present invention becomes a material that constitutes the negative electrode active material layer 12.

As described above, the negative electrode active material for nonaqueous electrolyte secondary batteries of the present invention contains particle of negative electrode active material, which has a silicon compound ($SiO_x$: $0.5 \leq x \leq 1.6$) on a part of a surface of which a carbon coating film was formed. Furthermore, degradation of the battery performance due to mixing of silicon dioxide during production can be suppressed because the negative electrode active material contains 2% by mass or less of particle of silicon dioxide, and a silicon dioxide-carbon composite secondary particle formed of a plurality of the particles of silicon dioxide and carbon are contained.

The particle of negative electrode active material in the present invention contains the particle of silicon compound containing a silicon compound capable of absorbing/releasing lithium ions as described above.

Particle of negative electrode active material included in the negative electrode active material of the present invention has a silicon oxide material containing a silicon compound ($SiO_x$: $0.5 \leq x \leq 1.6$), and it is preferable that the composition of the silicon compound has x closer to 1. This is because high cycle characteristics can be obtained. By the way, the composition of the silicon compound in the present invention does not necessarily mean a purity of 100%, and may contain a slight amount of impurities.

Furthermore, in the present invention, the particle of silicon compound containing a silicon compound ($SiO_x$) (hereinafter, referred to also as "silicon compound ($SiO_x$) particle") can obtain appropriate electric conductivity because at least a part of a surface thereof contains a carbon coating film.

Furthermore, the negative electrode active material of the present invention contains 2% by mass or less of particle of silicon dioxide. Although a magnitude of the particle of silicon dioxide is not particularly limited, the magnitude of 1 μm or less is preferable because this is a raw material mingled during preparation of the particle of silicon compound ($SiO_x$). This is because the smaller the particle of silicon dioxide is, the larger a contact area with particle of metallic silicon that is another raw material for preparation of the particle of silicon compound ($SiO_x$) can be made, and an efficiency of generation reaction of the silicon compound ($SiO_x$) can be improved.

A mass fraction of the particle of silicon dioxide relative to an entirety of the negative electrode active material can be confirmed by separating the particle of silicon dioxide and the silicon compound ($SiO_x$) by an air flow classification. By the way, this measurement can be performed in a state where the particle of silicon dioxide and particle of silicon compound ($SiO_x$) each are coated with carbon, and such the particle of silicon dioxide forms the composite secondary particle.

At this time, when the silicon dioxide adhered to the particle of silicon compound ($SiO_x$) is present, a mass fraction of the particle of silicon dioxide relative to an entirety of the negative electrode active material can be calculated by combining the air flow classification and morphology observation/element analysis.

Specifically, the mass fraction of the particle of silicon dioxide is calculated according to the following procedure. First, the air flow classification is performed regarding a powder of the negative electrode active material to measure each of masses of coarse powder and fine powder. Next, the morphological observation/elemental analysis is performed on many particles selected at random from each of the coarse powder and the fine powder using SEM-EDX (scanning electron microscope-energy dispersion type X-ray diffractometry) or the like. At this time, by identifying whether it is the particle of silicon dioxide from an element composition of each particle, an individual fraction of the particle of silicon dioxide is obtained, after that, by obtaining a volume of each particle, the mass fraction of the particle of silicon dioxide can be calculated.

At this time, it is preferable that a classification point is adjusted such that the particles of silicon dioxide are concentrated in either one of the coarse powder and the fine powder by the air flow classification. This is because the larger the concentration of the particle of silicon dioxide after the classification is, the more accurate value of the mass fraction of the calculated particle of silicon dioxide is obtained.

Furthermore, a volume of each particle can be obtained according to, for example, a method of obtaining an equivalent circle diameter from a projection area of each particle and calculating the volume by spherical approximation.

It is desirable that in the particle of negative electrode active material in the present invention the particle of silicon compound ($SiO_x$) is contained in the composite secondary particle as described above. Thus, when the particle of silicon compound having the capacity like this is contained in the composite secondary particle, local fluctuation of the capacity and potential during the battery charge/discharge can be suppressed and precipitation of lithium metal can be suppressed, and excellent cycle characteristics can be obtained.

In order to confirm the silicon compound ($SiO_x$) in the composite secondary particle, for example, an element analysis method can be used. As the element analysis method, for example, methods such as SEM-EDX, TEM-EDX (transmission electron microscope-energy dispersive type X-ray spectrometry) and the like can be used. Specifically, to each primary particle identified by morphological observation with SEM/TEM, a composition ratio of a Si element and an O element is calculated using EDX measurement, and the silicon dioxide and the silicon compound may be differentiated.

In the negative electrode active material of the present invention, at this time, it is preferable that an average particle size of the composite secondary particle is 1 µm or more and 15 mµ or less. When it is 1 µm or more, since a specific surface area is not so large, decomposition of the electrolytic solution on a surface of the composite secondary particle can be suppressed to a small amount. When it is 15 mµ or less, excellent electric conductivity can be obtained due to an appropriate contact area with the particle of negative electrode active material.

Furthermore, it is preferable that a major diameter L and a minor diameter D of the composite secondary particle satisfy a relationship of 1≤L/D≤5. This is because excellent electric conductivity can be obtained because, when the range like this is satisfied, the composite secondary particle is easily accommodated between the particles of negative electrode active material, and an appropriate contact area is maintained with the particle of negative electrode active material.

At this time, the major diameter L and minor diameter D are defined by the morphological observation with the SEM or TEM. Specifically, in a projection plane of the observed composite secondary particle, a length of a straight line obtained by binding two most separated points is taken as a major diameter, and a length of a part in the projection plane of straight line that is vertical to the major diameter and pass a center point of the major diameter is taken as a minor diameter.

Furthermore, it is preferable that at least a part of the particles of silicon dioxide that constitute the composite secondary particle is substantially spherical. Here, the "substantially spherical" means that a degree of circularity Lc/Lp defined by a ratio of a perimeter Lp of a cross section when a cross section of a particle is taken and a perimeter Lc of a circle equal to a cross sectional area of the particle is larger than 0.95. When the particle of silicon dioxide is spherical, a specific surface area becomes smaller, and also a specific surface area of the composite secondary particle containing the particles of silicon dioxide as a constituent becomes smaller. Furthermore, probability of contacting with the particle of negative electrode active material at a spherical surface having a curvature smaller than that of square becomes higher, and a large contact area is obtained. Therefore, excellent electric conductivity can be obtained while suppressing a reaction with the electrolytic solution on a surface of the composite secondary particle to a small amount.

As a shape confirmation method of the particle of silicon dioxide, morphological observation with AFM (Atomic Force Microscope), SEM-EDX, TEM-FDX or the like can be used.

Furthermore, in the present invention, it is preferable that a ratio of carbon relative to an entirety of the composite secondary particle is 60 at % or more. When the percentage content is like this, the electronic conductivity of the composite secondary particle can be improved.

The ratio of the carbon relative to an entirety of the composite secondary particle can be calculated from the element analysis or the like. As the element analysis method, for example, a carbon amount measurement device (due to a combustion in oxygen stream-infrared absorption method), XPS (X-ray Photoelectron Spectroscopy), SEM-EDX, TEM-EDX or the like can be used.

Furthermore, it is preferable that coverage of carbon on a surface of the composite secondary particle is 30% or more and an average film thickness of the carbon coating film is 30 nm or more. When the coverage of carbon on a surface of the composite secondary particle is 30% or more, the electric conductivity can be improved because the probability of contacting not with the silicon dioxide but with carbon becomes higher in a contact surface between the composite secondary particle and the particle of negative electrode active material. Furthermore, when the average film thickness of the carbon coating film on a surface of the composite secondary particle is 30 nm or more, excellent electronic conductivity can be obtained.

An element analysis of a surface can be used to confirm the coverage of the carbon on the surface of the composite secondary particle. XPS, SEM-EDX and so on can be used as the element analysis method of the surface. Furthermore, for example, the TEM can be used to confirm a thickness of the carbon coating film.

Furthermore, it is preferable that the composite secondary particle is 2% by mass or less relative to a total mass of the negative electrode active material. This is because the negative electrode active material having larger capacity may be obtained since when a content of the composite secondary particle is like this, the composite secondary particle having small capacity is slightly contained.

The mass fraction of the composite secondary particle relative to the total mass of the negative electrode active material can be calculated by combining the air flow classification and the element analysis in the same manner as in the method of obtaining the mass fraction of the particle of silicon dioxide.

Furthermore, it is preferable that the carbon coating film formed on the surface of the particle of silicon compound has scattering peaks at 1330 cm$^{-1}$ and 1580 cm$^{-1}$ in a Raman spectrum analysis, and an intensity ratio thereof $I_{1330}/I_{1580}$ satisfies a relationship of $0.7<I_{1330}/I_{1580}<2.0$.

Here, the Raman spectrum analysis will be detailed below. According to a Raman spectrum obtained by a microscope Raman analysis (that is, Raman spectrum analysis), a ratio of a carbon material (carbon coating film or carbon-based material) having a diamond structure and a carbon material having a graphite structure can be obtained. That is, diamond shows a Raman shift having a sharp peak at 1330 cm$^{-1}$ and graphite shows a Raman shift having a sharp peak at 1580 cm$^{-1}$, and by the intensity ratio thereof a ratio of the carbon material having the diamond structure and the carbon material having the graphite structure can be obtained in a simplified manner.

The diamond has high strength, high density and high electrical insulation properties, and the graphite has excellent electric conductivity. Therefore, the carbon coating film that satisfies the range of the intensity ratio $I_{1330}/I_{1580}$ are optimized in the respective characteristics of the diamond and the graphite, and, as a result, a negative electrode material capable of preventing electrode breakdown due to expansion/contraction of an electrode material accompanying during charge/discharge and having an excellent conductive network is obtained.

As a method of forming a carbon coating film on a surface of the particle of silicon compound, a method of coating the particle of silicon compound with a carbon material (carbon-based compound) such as graphite or the like can be used.

Furthermore, it is preferable that, in the carbon coating film, a fragment of a $C_yH_z$-based compound is detected by TOF-SIMS, and, as the fragment of the $C_yH_z$-based compound, one where "y" and "z" satisfy the range of 6≥y≥2 and 2y+2≥z≥2y−2 is detected in at least a part thereof.

The fragment of the $C_yH_z$-based compound is derived from a carbon coating film grown on a surface of the particle of silicon compound by the CVD method or the like, and a surface state where the compound fragment like this is detected becomes compatible with a binder such as CMC (carboxymethyl cellulose) or polyimide to result in improving the battery characteristics. Furthermore, in a surface state where the fragment of the $C_yH_z$-based compound that satisfies the above range is detected, the compatibility with the binder becomes more excellent to result in further improving the battery characteristics.

The fragment of the $C_yH_z$-based compound can be detected under, for example, the following conditions.
Apparatus used: PHI TRIFT 2 produced by ULVAC-PHI, INC.,
Primary Ion Source: Ga,
Sample Temperature: 25° C.,
Acceleration Voltage: 5 kV,
Spot Size: 100 μm×100 μm,
Sputter: Ga, 100 μm×100 μm, 10 s,
Negative Ion Mass Spectrum
Sample: Pressed Powder Pellet Furthermore, it is preferable that the carbon coating film on the surface of the particle of silicon compound has a weight average molecular weight measured by gel permeation chromatography using a polystyrene standard of 400 or more and 5000 or less, and contains a carbon-based compound soluble in a hydrocarbon solvent. Furthermore, it is preferable that a content of the carbon-based compound is 2 mass ppm or more and 6000 mass ppm or less relative to a total mass of the particle of silicon compound. When the weight average molecular weight of the carbon-based compound is 400 or more, elution into the electrolytic solution of the carbon-based compound can be suppressed, and when the weight average molecular weight is 5000 or less, the electric conductivity of the carbon coating film can be suppressed from degrading. Therefore, an adverse influence on the charge/discharge can be reduced. Still furthermore, it is more preferable that the weight average molecular weight is 600 or more and 3000 or less. This is because, in the range like this, an effect of suppressing a decomposition of the electrolytic solution during charge/discharge can be remarkably exhibited while maintaining the electric conductivity of the conductive carbon coating film.

As a method of obtaining a carbon coating film containing the carbon-based compound such as described above, for example, a thermal decomposition CVD (Chemical Vapor Deposition method) of the hydrocarbon gas can be used. In the thermal decomposition CVD of the hydrocarbon gas, a thermal decomposition of a precursor, and a dehydrogenation reaction are performed while repeating continuous cleavage and generation of carbon-hydrogen bond under high temperature. This continuous reaction is generated not only on a particle surface where a carbon coating film is formed but also in a gas phase. When the reaction condition is controlled, a part of a continuous reaction product in the vapour phase can be absorbed on the carbon coating film on the particle surface as a solvent soluble carbon-based compound.

Examples of the hydrocarbon solvents include pentane, hexane, cyclohexane, benzene, toluene, xylene, mesitylene, and octane.

Furthermore, it is preferable that a percentage content of the carbon coating film on a particle surface of silicon compound is 2% by mass or more and 20% by mass or less relative to a total mass of the particle of silicon compound and carbon coating film.

It is possible to surely improve the electric conductivity when the percentage content of the carbon coating film on the particle surface of silicon compound is 2% by mass or more like this. Furthermore, when the percentage content of the carbon coating film is 20% by mass or less, the battery characteristics are improved and the battery capacity becomes larger. When the carbon coating film is contained at a ratio like this, the silicon compound having high capacity can be contained at an appropriate ratio. Therefore, sufficient battery capacity can be secured.

In the negative electrode active material of the present invention, a relationship between an intensity (Ia) of a peak in the neighborhood of 2θ=21.8° and an intensity (Ib) of a peak in the neighborhood of 2θ=28.4° in a X-ray diffraction spectrum is preferably 0.8≤Ib/Ia≤4.0. When the X-ray diffraction spectrum has a peak intensity ratio like this, excellent battery characteristics can be obtained because the negative electrode active material combines appropriate strength, stability and electronic conductivity.

In the present invention, the lower the silicon crystallinity in the particle of silicon compound is, the better. Specifically, it is desirable that a half value width (2θ) of a diffraction peak attributable to a silicon (111) crystal plane obtained by X-ray diffraction of the particle of silicon compound is 1.2° or more and a crystallite size corresponding to the crystal plane is 7.5 nm or less. Due to the presence of the silicon compound d having low silicon crystallinity, the battery characteristics can be improved. Furthermore, stable Li compound can be generated in the inside or on a surface or for both thereof of the silicon compound.

Though not particularly limited, a median diameter of the particle of silicon compound is preferably 0.5 μm or more and 20 μm or less. This is because, in this range, lithium ions are easily absorbed/released during charge/discharge and the particle become difficult to be cracked. When the median diameter is 0.5 μm or more, the battery irreversible capacity can be reduced because a surface area does not increase. On the other hand, when the median diameter is 20 μm or less, it is preferable because the particle is difficult to be cracked and a newly generated surface is difficult to appear. By the way, a temperature in a measurement environment in the measurement of the median diameter was set to 25° C.

The negative electrode active material layer may contain a negative electrode conductive assistant other than the negative electrode active material. As the conductive assistant, any one kind or more of carbon black, acetylene black, graphite such as flake-like graphite, Ketjen Black, carbon nanotube, and carbon nanofiber can be used. These conductive assistants are preferable to be particulate one having a median diameter smaller than the particle of silicon compound.

In the present invention, the negative electrode active material layer 12 such as shown in FIG. 1 may further contain a carbon material (carbon-based active material) in addition to the negative electrode active material of the present invention. Thus, the electric resistance of the negative electrode active material layer 12 can be reduced, and expansion stress accompanying the charge can be alleviated. The carbon-based active material is, for example, pyrolyzed carbons, cokes, glass-like carbon fibers, organic polymer sinters, and carbon blacks.

In this case, it is preferable that the negative electrode of the present invention has a ratio of the silicon compound relative to a total mass of the carbon-based active material and the particle of silicon compound of 4% by mass or more. The negative electrode for nonaqueous electrolyte secondary batteries like this does not degrade the first time efficiency and capacity retention rate. Furthermore, the upper limit of the content is preferably smaller than 90% by mass.

The negative electrode active material layer 12 is formed by, for example, a coating method. The coating method is a method in which the particle of negative electrode active material and the binder, and, as needs arise, the conductive assistant and the carbon material are mixed, followed by dispersing in an organic solvent or water and coating.

(Production Method of Negative Electrode)

A method of producing a negative electrode of the present invention will be described. First, a negative electrode active material is produced: by preparing particle of silicon compound containing a silicon compound expressed by a general formula $SiO_x$ ($0.5 \leq x \leq 1.6$); by coating at least a part of a surface of the particle of silicon compound with a carbon coating film; and by forming a silicon dioxide-carbon composite secondary particle containing a plurality of particles of silicon dioxide and carbon; and by selecting negative electrode active material that contain 2% by mass or less of the particles of silicon dioxide and the silicon dioxide-carbon composite secondary particle from the produced negative electrode active material. Thus, after production of the negative electrode active material, the negative electrode active material is mixed with the conductive assistant, the binder and the solvent to obtain a slurry. Then, the slurry is coated on a surface of the negative electrode current collector and dried to form a negative electrode active material layer.

More specifically, the negative electrode is produced according to, for example, the following procedure.

At the beginning, a raw material that generates silicon oxide gas (referred to also as a vaporization starting material) is heated under presence of inert gas or under reduced pressure in the temperature range of from 900° C. to 1600° C. to generate silicon oxide gas. In this case, when considering the raw material being a mixture of metallic silicon powder and silicon dioxide powder and considering the presence of a oxygen on a surface of the metallic silicon powder and a slight amount of oxygen in a reaction furnace, a mixing molar ratio is desirably in the range of 0.8<metallic silicon powder/silicon dioxide powder<1.3. The Si crystallite in the particle of silicon compound can be controlled by changing a charge range or a vaporization temperature, or heat treatment after generation. Generated gas is deposited on a deposition plate. Here, by controlling a position of the deposition plate, a mixing amount of silicon dioxide powder of a raw material is controlled. With a temperature inside a silicon oxide reaction furnace lowered to 100° C. or less, a deposit is taken out, followed by crushing, pulverizing with a ball mill, a jet mill or the like. In the present invention where the silicon oxide powder is prepared as described above, the powder material is largely formed of $SiO_x$ ($0.5 \leq x \leq 1.6$) but silicon dioxide ($SiO_2$) particle is partially mixed.

Next, a carbon coating film is generated on a superficial layer of the obtained powder material.

As a method of forming a carbon coating film on a superficial layer of the obtained powder material, a thermal decomposition CVD is desirable. According to the thermal decomposition CVD, hydrocarbon gas is filled in a furnace where silicon oxide powder is set, and an internal temperature of the furnace is elevated. Although a decomposition temperature is not particularly limited, in particular, 1200° C. or less is desirable, and 950° C. or less is more desirable. This is because disproportionation of the particle of an active material can be suppressed.

When the carbon coating film is generated by the thermal decomposition CVD, by adjusting, for instance, pressure and temperature in the furnace, a carbon coating film that satisfies a desired peak intensity ratio $I_{1330}/I_{1583}$ in the Raman spectrum can be formed on a superficial layer of the powder material.

The hydrocarbon gas used in the thermal decomposition CVD is, though not particularly limited, desirable to be $n \leq 3$ in a $C_nH_m$ composition. This is because a production cost may be lowered, and, the physical properties of a decomposition product is excellent.

Furthermore, a silicon dioxide-carbon composite secondary particle containing a plurality of particles of silicon dioxide and carbon is formed.

As a method of forming the composite secondary particle, for example, the above described thermal decomposition CVD can be used. By adjusting pressure in the furnace, temperature in the furnace, a powder charge amount, a composition of the hydrocarbon gas and the like, a particle size of the composite secondary particle, a carbon content of the composite secondary particle, a mass fraction of the composite secondary particle to a total amount of the active material and the like can be controlled.

The step of forming a carbon coating film on a superficial layer of the particle of silicon compound and the step of forming composite secondary particle can be performed simultaneously or sequentially, but the simultaneously performing is preferable. This is because the simultaneous performing is simple and easy, and a low cost production is realized.

Furthermore, after the step of forming a carbon coating film on a superficial layer of the particle of silicon compound and the step of forming composite secondary particle, heat-treating under non-atmospheric environment and at a temperature higher than that of the thermal decomposition CVD can be applied as controlling the crystallinity of the silicon compound.

After production of the particle of a carbon-coated silicon compound and the silicon dioxide-carbon composite secondary particle, whether the negative electrode active material contains 2% by mass or less of the particle of silicon dioxide and contains the composite secondary particle is evaluated by means of the air flow classification and morphological observation such as SEM-EDX or the like.

Thus, by evaluating the mass fraction of the particle of silicon dioxide and the presence or absence of the composite secondary particle, and by selecting the negative electrode active material that contains 2% by mass or less of particle of silicon dioxide and contains the composite secondary particle, a negative electrode material for nonaqueous electrolyte secondary batteries is produced.

By the way, the selection of the negative electrode active material is not necessarily performed every time when producing the negative electrode active material. When the mass fraction of the particle of silicon dioxide and the presence or absence of the composite secondary particle are once evaluated and the production condition that contains 2% by mass or less of the particle of the silicon dioxide and contains the composite secondary particle are found and selected, after that, the negative electrode material may be produced under the same condition as the selected condition.

Furthermore, in the step of coating at least a part of a surface of the particle of silicon compound with the carbon coating film and the step of forming the silicon-dioxide-carbon composite secondary particle, a continuous furnace that continuously supplies and discharges the powder of negative electrode active material is preferably used. In particular, a system is preferable in which by setting a heating furnace set to the above heating temperature to the above process atmosphere, by charging the powder of negative electrode active material, and by holding in the heating furnace for a definite time, the step of forming the carbon coating film and the step of forming the composite secondary particle are simultaneously performed, followed by taking out the treated powder of negative electrode active material. As a specific production apparatus, a roller hearth kiln or a rotary kiln can be used. From the viewpoint of particularly high productivity, the rotary kiln is adequate.

(2. Lithium Ion Secondary Battery)

Next, a lithium ion secondary battery in which the above described negative electrode for nonaqueous electrolyte secondary batteries is used will be described.

(Structure of Laminate Film Type Secondary Battery)

Figure 3:
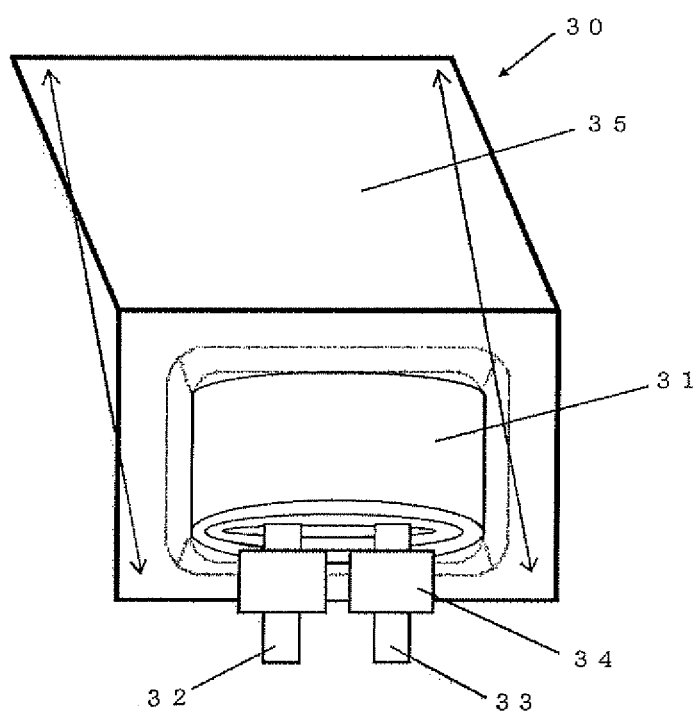
FIG. 3 is an exploded diagram showing one example of a structure of a secondary battery (laminate film type) that uses the negative electrode for nonaqueous electrolyte secondary batteries of the present invention.

A laminate film type secondary battery 30 shown in FIG. 3 houses a wound electrode body 31 mainly inside a sheet-like exterior member 35. The wound body has a separator between a positive electrode and a negative electrode and is formed by winding. Furthermore, there is a case where the positive electrode and the negative electrode have a separator therebetween and house a laminate body. In either of electrode bodies, a positive electrode lead 32 is attached to the positive electrode, and a negative electrode lead 33 is attached to the negative electrode. An outermost peripheral part of the electrode body is protected by a protective tape.

The positive and negative electrode leads are led, for example, in one direction from the inside of the exterior member 35 toward an outside thereof. The positive electrode lead 32 is made of an electrically conductive material such as aluminum or the like, and the negative electrode lead 33 is made of an electrically conductive material such as nickel or copper.

The exterior member 35 is a laminate film in which, for example, a fusion layer, a metal layer, and a surface protective layer are laminated in this order, and in the laminate film, outer peripheral parts in fusion layers of two sheets of film are fused with each other or adhered by an adhesive such that the fusion layers may face with the electrode body 31. The fusion layer is a film such as polyethylene or polypropylene, and the metal layer is an aluminum foil or the like. The protective layer is, for example, nylon or the like.

An adhesive film 34 is inserted between the exterior member 35 and the positive and negative electrode leads to prevent outer air from intruding. The material is, for example, a polyethylene, polypropylene, or polyolefin resin.

(Positive Electrode)

A positive electrode has a positive electrode active material layer on both sides or on one side of a positive electrode current collector in the same manner as in the negative electrode 10 of, for example, FIG. 1.

The positive electrode current collector is made of an electrically conductive material such as aluminum.

A positive electrode active material layer contains any one or more kinds of positive electrode materials capable of absorbing/releasing lithium ions, and, may contain other materials such as a binder, a conductive assistant, and a dispersant depending on a design. In this case, details of the binder and the conductive assistant are the same, for example, as in the negative electrode binder and the negative electrode conductive assistant described above.

As the positive electrode material, a Li-containing compound is desirable. As the Li-containing compound, for example, a composite oxide made of lithium and a transition metal element, or a phosphate compound having the Li and the transition metal element can be used. Among these positive electrode materials described above, compounds containing at least one or more kinds of nickel, iron, manganese, and cobalt are preferred. Chemical formulas for these are expressed by, for example, $Li_xM_1O_2$ or $Li_yM_2PO_4$. In the formulas, $M_1$ and $M_2$ express at least one or more kinds of the transition metal elements. Values of x and y show different values depending on a battery charge/discharge state, but, are generally shown by $0.05 \leq x \leq 1.10$ and $0.05 \leq y \leq 1.10$.

As the composite oxide containing the lithium and the transition metal element, for example, a lithium-cobalt composite oxide ($Li_xCoO_2$), a lithium-nickel composite oxide ($Li_xNiO_2$) can be used. As the phosphate compound having the lithium and the transition metal element, for example, a lithium-iron phosphate compound ($LiFePO_4$) or a lithium-iron-manganese phosphate compound ($LiFe_{1-u}Mn_uPO_4$ ($0<u<1$)) can be used. This is because when these positive electrode materials are used, high battery capacity is obtained and excellent cycle characteristics is also obtained.

(Negative Electrode)

A negative electrode has the same structure as the negative electrode 10 for lithium ion secondary batteries of the FIG. 1, and has a negative electrode active material layer 12, for example, on both sides of the current collector 11. The negative electrode preferably has a negative electrode charge capacity larger than an electric capacity (charge capacity as a battery) obtained from a positive electrode active material agent. This is because the precipitation of the lithium metal on the negative electrode can be suppressed.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face each other is hardly influenced by the charge/discharge. Therefore, a state of the negative electrode active material layer just immediately after the formation is maintained. Thereby, a composition of the negative electrode active material or the like can be accurately investigated with excellent reproducibility irrespective of the presence or absence of the charge/discharge.

(Separator)

The separator separates the positive electrode and the negative electrode and allows passage of lithium ions while preventing current short-circuit accompanying the contact of both electrodes from occurring. The separator is, for example, formed of a porous film made of a synthetic resin, or ceramic, and may have a stacked structure in which two or more kinds of porous films are stacked. Examples of the synthetic resin include polytetrafluoroethylene, polypropylene, or polyethylene.

(Electrolytic Solution)

At least a part of the active material layer or the separator is impregnated with a liquid electrolyte (electrolytic solution). The electrolytic solution has an electrolyte salt dissolved in a solvent and may contain other materials such as an additive or the like.

As the solvent, for example, a nonaqueous solvent can be used. Examples of the nonaqueous solvents include ethylene carbonate, propylene carbonate, butylene carbonate, dimethyl carbonate, diethyl carbonate, ethyl methyl carbonate, methyl propyl carbonate, 1,2-dimethoxy ethane, and tetrahydrofuran.

Among these, it is desirable to use at least one or more kinds of ethylene carbonate, propylene carbonate, dimethyl carbonate, diethyl carbonate, and ethyl methyl carbonate. This is because more excellent characteristics can be obtained. Furthermore, in this case, more advantageous characteristics can be obtained by combining a high viscosity solvent such as ethylene carbonate or propylene carbonate and a low viscosity solvent such as dimethyl carbonate, ethyl methyl carbonate or diethyl carbonate. This is because dissociability or ionic mobility of the electrolyte salt is improved.

It is preferable to contain an unsaturated carbon bond cyclic carbonate ester as a solvent additive. This is because a stable film is formed on a surface of the negative electrode during charge/discharge to be able to suppress a decomposition reaction of the electrolytic solution. Examples of the unsaturated carbon bond cyclic carbonate ester include, for example, vinylene carbonate and vinyl ethylene carbonate.

Furthermore, it is preferable to contain a sultone (cyclic sulfonic acid ester) as the solvent additive. This is because the chemical stability of the battery is improved. Examples of the sultone include propane sultone and propene sultone.

Furthermore, the solvent preferably contains an acid anhydride. This is because the chemical stability of the electrolytic solution is improved. As the acid anhydride, for example, propane disulfonic anhydride can be used.

The electrolyte salt can contain any one or more kinds of light metal salts such as lithium salts. As the lithium salt, for example, lithium hexafluorophosphate ($LiPF_6$), lithium tetrafluoroborate ($LiBF_4$) or the like can be used.

A content of the electrolyte salt is preferably 0.5 mol/kg or more and 2.5 mol/kg or less relative to the solvent. This is because high ionic conductivity is obtained.

(Production Method of Laminate Film Type Secondary Battery)

At the beginning, a positive electrode is prepared with the above positive electrode material. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating apparatus such as a knife roll or a die coater with a die head and dried with hot air to obtain a positive electrode active material layer. At the end, the positive electrode active material layer is compression molded by a roll press machine or the like. At this time, heating may be applied, or, compression, heating may be repeated a plurality of times.

Next, by using the same operation procedure as in the preparation of the above described negative electrode for lithium ion secondary batteries 10, the negative electrode active material layer is formed on the negative electrode current collector to form a negative electrode.

The positive electrode and the negative electrode are prepared according to the above described similar preparation procedure. In this case, the respective active material layer is formed on both sides of the positive electrode and negative electrode current collectors. At this time, in any of the electrodes, active material coating lengths on the both surface parts may be different (see FIG. 1).

Subsequently, an electrolytic solution is prepared. Further subsequently, by using ultrasonic welding or the like, the positive electrode lead 32 is attached to the positive electrode current collector and the negative electrode lead 33 is attached to the negative electrode current collector. Then, the positive electrode and the negative electrode are stacked or wound via the separator to prepare a wound electrode body, followed by adhering a protective tape to the outermost peripheral part thereof. Next, the wound electrode body is molded into a flat shape. Then, after inserting the wound electrode body between folded film-like exterior member 35, insulation parts of the exterior member are adhered by a thermal fusion method with each other, and with only one direction opened, the wound electrode body is encapsulated. Then, an adhesive film 34 is inserted between the positive electrode lead 32 and the exterior member 35, and between the negative electrode lead 33 and the exterior member 35. A predetermined amount of the above prepared electrolytic solution is charged from a releasing part, followed by vacuum impregnation. After the impregnation, the releasing part is adhered by a vacuum thermal fusion method.

As was described above, the laminate film type secondary battery 30 can be produced.

EXAMPLES

Hereinafter, the present invention will be more specifically described with reference to Examples and Comparative Examples. However, the present invention is not limited thereto.

Example 1-1

According to the following procedure, a laminate film type secondary battery 30 shown in FIG. 3 was prepared.

First, a positive electrode was prepared. A positive electrode mixture was prepared by mixing 95 parts by mass of $LiCoO_2$ that is lithium-cobalt composite oxide as a positive electrode active material, 2.5 parts by mass of a positive electrode conductive assistant, and 2.5 parts by mass of a positive electrode binder (polyvinylidene fluoride: PVDF). Subsequently, the positive electrode mixture was dispersed in an organic solvent (N-methyl-2-pyrrolydone: NMP) to form a paste-like slurry. Subsequently, the slurry was coated on both sides of a positive electrode current collector with a coating apparatus having a die head, followed by drying with a hot air type dryer. At this time, the positive electrode current collector having a thickness of 15 μm was used. At the end, a roll press was used to perform compression molding.

Next, a negative electrode was prepared. In order to prepare a negative electrode active material, first, a vaporization starting material obtained by mixing metallic silicon and silicon dioxide was set in a reaction furnace, was deposited in a vacuum of 10 Pa, and, after sufficiently cooling, a deposit was taken out and pulverized by a ball mill, followed by adjusting a particle size.

After adjusting the particle size, in order to obtain a carbon coating film and composite secondary particle, a thermal decomposition CVD was performed. As a thermal decomposition CVD apparatus, a rotary kiln provided with a reaction gas inlet port and a carrier gas inlet port, and provided with a rotational cylindrical furnace having an inner diameter of 200 mm and a length of 3 m was prepared. At this time, an inclination angle in a furnace axis direction was set to 1 degree. After that, 20 kg of powder was charged into a tank, followed by heating the inside of the furnace to 1050° C. and holding there under nitrogen atmosphere.

After completion of temperature elevation, particle of the raw material was charged into the furnace at the speed of 1.0 Kg/h, followed by introducing methane as a reaction gas at 12 L/min, and nitrogen as a carrier gas at 15 L/min. At this time, the number of revolutions of the furnace was set to 1 rpm, and inner furnace pressure was adjusted to be 20 Pa positive relative to atmospheric pressure. According to the thermal decomposition CVD process, a carbon coating film was formed on a surface of the particle of silicon compound ($SiO_x$), and, simultaneously composite secondary particle was obtained.

The obtained powder of negative electrode active material had a value of x of the silicon compound $SiO_x$ of 0.5 and the median diameter $D_{50}$ of the silicon compound of 5.4 μm. Furthermore, the particle of silicon compound had a half value width (2θ) of a diffraction peak derived from a (111) crystal plane obtained by x-ray diffractometry of 1.85° and a crystallite size attributable to the crystal plane (111) of 4.72 nm. At this time, peaks were found at 2θ=21.8° (peak intensity Ia) and 2θ=28.4° (peak intensity Ib) in x-ray diffractometry and peak intensity ratio thereof was Ib/Ia=1.95.

A percentage content of the carbon coating film was 5% by mass relative to a sum total of the particle of silicon compound ($SiO_x$) and the carbon coating film, a film thickness of the carbon coating film was 100 nm, and the coverage on a surface of the particle of silicon compound of the carbon coating film was 80%. Furthermore, the peak intensity ratio in a Raman spectrum was $I_{1330}/I_{1580}=1.2$. Furthermore, a ratio of carbon relative to an entirety of the composite secondary particle was 60 at %. Furthermore, the coverage of the carbon on a surface of the composite secondary particle was 90%, and an average film thickness of the carbon coating film was 150 nm. Still furthermore, from the carbon coating film on a surface of the particle of silicon compound, the fragment of the $C_yH_z$-based compound was detected by the TOF-SIMS, and in the fragment of the $C_yH_z$-based compound, y=2, 3, 4 and "z" was 2y−2, 2y, 2y+2. Furthermore, the carbon coating film on a surface of the particle of silicon compound had a weight average molecular weight measured by the gel permeation chromatography using a polystyrene standard of 840, and a content of the carbon-based compound soluble in a hydrocarbon solvent was 330 mass ppm relative to a total mass of the particle of silicon compound. Here, a measurement method of the weight average molecular weight due to the gel permeation chromatography (hereinafter, referred to also as "GPC") will be described. First, in order to extract the carbon-based compound contained in the carbon coating film of the particle of silicon compound, 100 g of the particle of silicon compound coated with the carbon coating film (A1) was charged in a 1 L separable flask, 500 g of toluene was added, followed by stirring with a stirrer. After extraction for 3 hours under toluene reflux, the particle was filtered, a toluene layer was concentrated, and 33 mg of the carbon-based compound (A2) was obtained thereby. Thus, the content of the carbon-based compound relative to the particle of silicon compound was calculated as 330 mass ppm. Subsequently, the carbon-based compound (A2) was dissolved in tetrahydrofuran, the GPC measurement was performed, and the molecular weight thereof was calculated from a calibration curve prepared using the polystyrene standard. Since a GPC chart has several peaks, the carbon-based compound (A2) was found to be a mixture of components having different molecular weights. A weight average molecular weight obtained from all peaks was 840.

Figure 2:
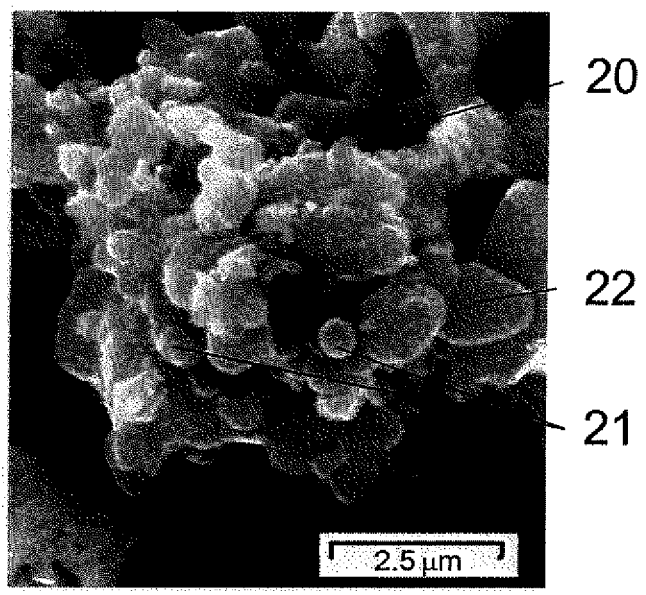
FIG. 2 is a SEM image of a silicon dioxide-carbon composite secondary particle contained in the negative electrode active material for nonaqueous electrolyte secondary batteries of the present invention.

Subsequently, in order to obtain mass fractions of the particle of silicon dioxide and the composite secondary particle in the powder of negative electrode active material, an air flow classification and an element analysis with using SEM-EDX was performed. As a result, the mass fractions relative to the powder of negative electrode active material were 0.75% by mass for the particle of silicon dioxide and 1.8% by mass for the composite secondary particle, respectively. Furthermore, spherical silicon dioxide aggregates containing the particle of silicon compound ($SiO_x$) was found, an average particle size of the composite secondary particle was 6 μm, and a ratio of a minor diameter D relative to a major diameter L was L/D=3. A SEM image of the obtained silicon dioxide-carbon composite secondary particle is shown in FIG. 2. In FIG. 2, the silicon dioxide-carbon composite secondary particle 20 (an aggregate having a diameter of about 7 μm in FIG. 2) contains the silicon dioxide particle 21 and the silicon compound ($SiO_x$) particle 22. By the way, the silicon dioxide particle 21 and the silicon compound ($SiO_x$) particle 22 are covered with the carbon coating film, respectively.

Next, the particle of negative electrode active material, a negative electrode binder 1 (polyacrylic acid), a negative electrode binder 2 (carboxymethylcellulose), a negative electrode binder 3 (SBR (styrene/butadiene rubber)), a conductive assistant 1 (flake-like graphite), a conductive assistant 2 (acetylene black) and a conductive assistant 3 (carbon nanotube) were mixed at a dry mass ratio of 90:2:2.5:2.5:1:0.5:1.5, followed by diluting with pure water to prepare a paste-like negative electrode mixture slurry. As a solvent of polyacrylic acid used as the negative electrode binder, water was used. Subsequently, the negative electrode mixture slurry was coated on both sides of the negative electrode current collector by using a coating apparatus and dried. As the negative electrode current collector, an electrolytic copper foil (thickness: 15 μm) was used. At the end, the baking was performed at 90° C. for 1 hour in a vacuum atmosphere. Thus, the negative electrode active material layer was formed.

Next, after solvents (4-fluoro-1,3-dioxolan-2-one (FEC), ethylene carbonate (EC) and dimethyl carbonate (DMC)) were mixed, an electrolyte salt (lithium hexafluorophosphate: $LiPF_6$) was dissolved to prepare an electrolytic solution. In this case, a composition of the solvent was set to FEC:EC:DMC=10:20:70 by volume ratio, and a content of the electrolyte salt was set to 1.0 mol/kg relative to the solvent.

Next, a secondary battery was assembled as shown below. At the beginning, an aluminum lead was ultrasonically welded to one end of the positive electrode current collector, and a nickel lead was welded to the negative electrode current collector. Subsequently, the positive electrode, the separator, the negative electrode, and the separator were stacked in this order, and wound in the longitudinal direction to obtain a wound electrode body. A winding end part thereof was fixed with a PET protective tape. As the separator, a stacked film (thickness: 12 μm) in which a film having a porous polyethylene as a main component is sandwiched by a film having a porous polypropylene as a main component was used. Subsequently, after sandwiching the electrode body between the exterior members, outer periphery parts excluding one side were thermally fused each other and the electrode body was housed inside thereof. As the exterior member, an aluminum laminated film in which a nylon film, an aluminum foil, and a polypropylene film are stacked, was used. Subsequently, the prepared electrolytic solution was charged from an opening part and was impregnated under a vacuum atmosphere, followed by the thermal fusion to seal.

Examples 1-2 to 1-5, Comparative Example 1-1, Comparative Example 1-2

Each of secondary batteries was prepared in the same procedure as in Example 1-1 except that an oxygen amount in a bulk of the particle of silicon compound was adjusted. In this case, an amount of oxygen was adjusted by varying a ratio of the vaporization starting material and a temperature. Values of x of the silicon compound expressed by SiOx in Examples 1-1 to 1-5, Comparative Examples 1-1 and 1-2 are shown in Table 1.

When the first time charge/discharge characteristics (first time efficiency (%)) and cycle characteristics (retention rate (%)) were investigated of Examples 1-1 to 1-5, and Comparative Examples 1-1 and 1-2, results shown in Table 1 were obtained.

The cycle characteristics were investigated as shown below. At the beginning, two cycles of charge/discharge were carried out under the atmosphere of 25° C. for stabilizing the battery, and a discharge capacity at the second cycle was measured. Subsequently, the charge/discharge was performed until a total number of cycles becomes 100 cycles, and the discharge capacity was measured at each cycle. At the end, a capacity retention rate (hereinafter, referred to also simply as retention rate in some cases) was calculated by dividing the discharge capacity at the 100th cycles by the discharge capacity at the $2^{nd}$ cycle, followed by multiplying by 100 for percentage expression. As the cycle condition, until 4.3 V is reached, charge under the constant current density of 2.5 mA/cm$^2$ was carried out, and at the stage where a voltage of 4.3 V is reached, the charge was carried out at a constant voltage of 4.3 V until the current density reaches 0.25 mA/cm$^2$. Furthermore, during the discharge, the discharge was carried out at the constant current density of 2.5 mA/cm2 until the voltage reaches 3.0 V.

When investigating the first time charge/discharge characteristics, a first time efficiency (hereinafter, in some cases, referred to as initial efficiency) was calculated. The first time efficiency was calculated from a formula expressed by first time efficiency (%)=(first time discharge capacity/first time charge capacity)×100. The atmosphere temperature was set to the same as in the case where the cycle characteristics were investigated. The charge/discharge condition was carried out at 0.2 times that of the cycle characteristics. That is, the charge was carried out at the constant current density of 0.5 mA/cm$^2$ until 4.3 V is reached, and at the stage where the voltage reached 4.3 V, the charge was carried out at the constant voltage of 4.3 V until the current density reaches 0.05 mA/cm$^2$, and during the discharge, the discharge was carried out at the constant current density of 0.5 mA/cm$^2$ until the voltage reaches 3.0 V.

The retention rate and the first time efficiency shown in following Table 1 to Table 10 are a retention rate and a first time efficiency when only an active material that does not contain a carbon-based active material such as natural graphite (for example, average particle size: 20 μm) and is mainly made of the particle of silicon compound having the carbon coating film is used as the negative electrode active material, that is, the retention rate and first time efficiency of the silicon compound. Thus, variation of the retention rate and first time efficiency depending only on variation of the silicon compound (variation of oxygen amount, crystallinity, and median diameter), variation of the carbon coating film (content, film quality) and variation of the composite secondary particle (mass fraction, composition ratio, shape) could be measured.

TABLE 1

| | X of SiOx | First Time Efficiency (%) | Capacity Retention Rate (%) |
|---|---|---|---|
| Comparative Example 1-1 | 0.3 | 74.9 | 64.0 |
| Example 1-1 | 0.5 | 72.3 | 77.1 |
| Example 1-2 | 0.7 | 70.1 | 78.6 |
| Example 1-3 | 0.9 | 68.4 | 80.3 |
| Example 1-4 | 1.2 | 68.1 | 81.3 |
| Example 1-5 | 1.6 | 67.0 | 79.3 |
| Comparative Example 1-2 | 1.8 | — | — |

SiO$_x$, d$_{50}$=5.4 μm, XRD half value width 2θ=1.85, Si (111) crystallite: 4.72 nm, Ib/Ia=1.95, I$_{1330}$/I$_{1580}$=1.2, C percentage content: 5% by mass, C layer thickness: 100 nm, C layer coverage: 80%, SiO$_2$ particle: spherical, mass fraction of SiO$_2$: 0.75% by mass, composite particle: containing SiO$_x$, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPO weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As shown in Table 1, the battery characteristics were degraded when a value of x is outside of 0.5≤x≤1.6 in the silicon compound expressed by SiO$_x$. As shown in Comparative Example 1-1, for example, when oxygen is not sufficient (x=0.3), the first time efficiency was improved but the capacity retention rate was drastically degraded. On the other hand, as shown in Comparative Example 1-2, when the oxygen is abundant (x=1.8), the electric conductivity was degraded, and both the retention rate and initial efficiency were degraded to result in incapability of measurement.

Example 2-1 to Example 2-4, Comparative Example 2-1 to Comparative Example 2-3

Each secondary battery was produced fundamentally in the same procedure as in Example 1-3. However, in the silicon compound expressed by SiO$_x$, the mass fraction of the particle of silicon dioxide, presence or absence of the composite secondary particle, and the presence and absence of the particle of silicon compound in the composite secondary particle in the powder of negative electrode active material were varied as shown in Table 2 by varying a positional relationship of the vaporization starting material and the deposition plate. When the first time charge/discharge characteristics and cycle characteristics of secondary batteries of Example 2-1 to Example 2-4 and Comparative Example 2-1 to Comparative Example 2-3 were investigated, results shown in Table 2 were obtained.

TABLE 2

|  | SiO$_2$ content (% by mass) | Composite secondary particle | SiOx contained | First Time Efficiency (%) | Capacity Retention Rate (%) |
|---|---|---|---|---|---|
| Comparative Example 2-1 | 1 | No | — | 63.0 | 69.6 |
| Comparative Example 2-2 | 2.5 | No | — | 61.0 | 64.1 |
| Example 2-1 | 0.1 | Yes | Yes | 68.6 | 81.0 |
| Example 2-2 | 0.75 | Yes | No | 68.0 | 78.0 |
| Example 1-3 | 0.75 | Yes | Yes | 68.4 | 80.3 |
| Example 2-3 | 1.8 | Yes | No | 67.7 | 77.7 |
| Example 2-4 | 1.8 | Yes | Yes | 68.0 | 78.8 |
| Comparative Example 2-3 | 2.5 | Yes | Yes | 67.0 | 67.8 |

SiO$_x$ (x=0.9), d$_{50}$=5.4 μm, XRD half value width 2θ=1.85, Si (111) crystallite: 4.72 nm, Ib/Ia=1.95, I$_{1330}$/I$_{1580}$=1.2, C percentage content: 5% by mass, C layer thickness: 100 nm, C layer coverage: 80%, SiO$_2$ particle: spherical particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As shown in Table 2, excellent first time efficiencies and capacity retention rates were obtained in the silicon compounds containing the composite secondary particle of Examples 2-1 to 2-4 than in the silicon compounds that do not contain the composite secondary particle of Comparative Example 2-1 and Comparative Example 2-2. Furthermore, the first time efficiency and capacity retention rate were degraded when the particle of silicon dioxide were contained exceeding 2% by mass even if the composite secondary particle was contained. Furthermore, the capacity retention rate was improved when the composite secondary particle contains particle of the silicon compound (SiO$_x$) than in the case where the SiO$_x$ is not contained.

Example 3-1 to Example 3-11

Each secondary battery was produced in the same procedure as in Example 1-3 except that an average particle size and a ratio L/D of a major diameter to a minor diameter of the composite secondary particle contained in the powder of negative electrode active material, and a shape of the particle of silicon dioxide of the composite secondary particle contained in the powder of negative electrode active material were varied. The average particle size and L/D of the composite secondary particle contained in the powder of negative electrode active material were controlled by adjusting the number of revolution and an inclination of a rotary kiln during thermal decomposition CVD. Furthermore, the shape of the particle of silicon dioxide was controlled by changing the kind of a silicon dioxide raw material in the vaporization starting material. When the cycle characteristics and first time charge/discharge characteristics of secondary batteries of Example 3-1 to Example 3-11 were investigated, results shown in Table 3 were obtained.

TABLE 3

|  | Particle Size of Composite secondary particle (μm) | L/D | Shape of SiO$_2$ Particle | First Time Efficiency (%) | Capacity Retention Rate (%) |
|---|---|---|---|---|---|
| Example 3-1 | 0.5 | 3.0 | Spherical | 65.0 | 75.5 |
| Example 3-2 | 1.2 | 3.0 | Spherical | 67.0 | 78.2 |
| Example 3-3 | 6 | 1.4 | Spherical | 68.7 | 81.1 |
| Example 1-3 | 6 | 3.0 | Spherical | 68.4 | 80.3 |
| Example 3-4 | 6 | 3.0 | Square | 67.2 | 76.6 |
| Example 3-5 | 6 | 4.6 | Spherical | 68.1 | 79.8 |
| Example 3-6 | 6 | 4.6 | Square | 66.9 | 76.0 |
| Example 3-7 | 6 | 5.3 | Spherical | 67.0 | 76.6 |
| Example 3-8 | 6 | 7.0 | Spherical | 66.5 | 75.0 |
| Example 3-9 | 13 | 3.0 | Spherical | 68.6 | 79.5 |
| Example 3-10 | 17 | 3.0 | Spherical | 67.2 | 76.9 |
| Example 3-11 | 30 | 3.0 | Spherical | 66.5 | 75.0 |

SiO$_x$ (x=0.9), d$_{50}$=5.4 μm, XRD half value width 2θ=1.85, Si (111) crystallite: 4.72 nm, Ib/Ia=1.95, I$_{1330}$/I$_{1580}$=1.2, C percentage content: 5% by mass, C layer thickness: 100 nm, C layer coverage: 80%, mass fraction of SiO$_2$: 0.75% by mass, composite particle: SiO$_x$ contained, mass fraction of composite particle: 1.8% by mass, C percentage content of composite particle: 80 at %; C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As shown in Table 3, when the average particle size and the ratio L/D of a major diameter to a minor diameter of the composite secondary particle in the powder of negative electrode active material, and the shape of the particle of silicon dioxide of the composite secondary particle in the powder of negative electrode active material were varied, the capacity retention rate and first time efficiency were varied. Excellent first time efficiency and capacity retention rate were obtained when the particle size of the composite particle is in the range of 1 μm or more and 15 μm or less. Furthermore, more excellent capacity retention rate was obtained when the range of 1≤L/D≤5 is satisfied than the case of L/D>5. Furthermore, when the shape of the particle of silicon dioxide is spherical, more excellent first time efficiency and capacity retention rate were obtained than in the case where the shape of the particle of silicon dioxide is square.

Example 4-1 to Example 4-6, Comparative Example 4-1

Each secondary battery was produced in the same procedure as in Example 1-3 except that a carbon element ratio, a surface coverage of carbon, and a coated carbon coating film thickness of the composite secondary particle in the powder of negative electrode active material, and a mass fraction of the composite secondary particle relative to a sum total of the negative electrode active material powder were varied as shown in Table 4. The carbon element ratio, the surface coverage, the coated carbon coating film thickness and the mass fraction of the composite secondary particle were controlled by adjusting a carbon source gas flow rate and a flow rate of a carrier gas of the rotary kiln during the thermal decomposition CVD. When the first time charge/discharge characteristics and cycle characteristics of secondary batteries of Example 4-1 to Example 4-6 and Comparative Example 4-1 were investigated, results shown in Table 4 were obtained.

TABLE 4

| | C Percentage Content of Composite secondary particle (at %) | Coverage of Composite secondary particle (%) | C Film Thickness of Composite secondary particle (nm) | Ratio of Composite secondary particle (% by mass) | First Time Efficiency (%) | Capacity Retention Rate (%) |
|---|---|---|---|---|---|---|
| Comparative Example 4-1 | 0 | 0 | 0 | 0.5 | 65.0 | 69.3 |
| Example 4-1 | 10 | 10.0 | 10.0 | 0.8 | 66.8 | 74.0 |
| Example 4-2 | 25 | 25.0 | 26.0 | 0.9 | 67.4 | 75.8 |
| Example 4-3 | 55 | 40.0 | 35.0 | 1.3 | 67.7 | 77.0 |
| Example 4-4 | 63 | 25.0 | 26.0 | 1.5 | 67.6 | 77.0 |
| Example 4-5 | 63 | 60.0 | 80.0 | 1.5 | 68.0 | 79.5 |
| Example 1-3 | 80 | 90.0 | 150.0 | 1.8 | 68.4 | 80.3 |
| Example 4-6 | 95 | 90.0 | 150.0 | 3.3 | 68.8 | 76.3 |

$SiO_x$ (x=0.9), $d_{50}$=5.4 μm, XRD half value width 2θ=1.85, Si (111) crystallite: 4.72 nm, Ib/Ia=1.95, $I_{1330}/I_{1580}$=1.2, C percentage content: 5% by mass, C layer thickness: 100 nm, C layer coverage: 80%, $SiO_2$ particle: spherical, mass fraction of $SiO_2$: 0.75% by mass, composite particle: $SiO_x$ contained, particle size of composite particle: 6 μm, L/D=3, TOF-SIMS: (y,z)=({2, 3, 4}), {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), $LiPF_6$ 1.0 mol/kg, positive electrode $LiCoO_2$ As obvious from Table 4, the first time efficiency and capacity retention rate were degraded when the carbon is not contained in the composite secondary particle. By contrast, excellent first time efficiency and capacity retention rate were found when the carbon is contained in the composite secondary particle and more excellent battery characteristics were obtained when a carbon element rate is 60 at % or more. Furthermore, excellent first time efficiency and capacity retention rate were found when the carbon coverage of the composite secondary particle is 30% or more and the carbon coating film thickness is 30 nm or more. Furthermore, more excellent results were obtained when the mass fraction of the composite secondary particle is in the range of 2% by mass or less than the case of 2% by mass or more.

Example 5-1 to Example 5-4

Each secondary battery was produced in the same procedure as in Example 1-3 except that the $C_yH_z$ fragment detected from the carbon coating film on a surface of the particle of silicon compound in the TOF-SIMS was changed as shown in Table 5. The $C_yH_z$ fragment kind was controlled by adjusting a gas kind, a CVD temperature and a CVD post treatment temperature used during the thermal decomposition CVD. When the first time charge/discharge characteristics and cycle characteristics of secondary batteries of Example 5-1 to Example 5-4 were investigated, results shown in Table 5 were obtained.

TABLE 5

| | TOF-SIMS $C_yH_z$ Fragment | | First Time Efficiency (%) | Capacity Retention Rate (%) |
|---|---|---|---|---|
| | y | z | | |
| Example 5-1 | — | — | 65.0 | 69.3 |
| Example 1-3 | 2, 3, 4 | 2y − 1, 2y + 1, 2y + 3 | 68.4 | 80.3 |
| Example 5-2 | 2, 3, 4 | 2y − 2, 2y, 2y + 2 | 67.7 | 79.8 |
| Example 5-3 | 2, 3, 4, 5 | 2y − 2, 2y, 2y + 2 | 67.3 | 78.5 |
| Example 5-4 | 2, 3, 4, 5, 6 | 2y − 2, 2y, 2y + 2 | 66.7 | 77.1 |

$SiO_x$ (x=0.9), $d_{50}$=5.4 XRD half value width 2θ=1.85, Si (111) crystallite: 4.72 nm, Ib/Ia=1.95, $I_{1330}/I_{1580}$=1.2, C percentage content: 5% by mass, C layer thickness: 100 nm, C layer coverage: 80%, $SiO_2$ particle: spherical, mass fraction of $SiO_2$: 0.75% by mass, composite particle: $SiO_x$ contained, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, GPC weight average molecular weight: 840, content of extracted organics: 330 mass ppm, binder: polyacrylic acid, carboxymethylcellulose, SBR, electrolytic solution: FEC:EC:DMC (1:2:7 vol %), $LiPF_6$ 1.0 mol/kg, positive electrode $LiCoO_2$ As obvious from Table 5, when a fragment of a $C_yH_z$-based compound in which "y" and "z" satisfy the range of 6≥y≥2 and 2y+2≥z≥2y−2 was detected, the battery characteristics were improved. In particular, when a value of "y" is small, that is, only a fragment of the $C_yH_z$-based compound of y=2, 3, 4 is detected, the battery characteristics were more improved.

Example 6-1 to Example 6-11

Each secondary battery was produced in the same procedure as in Example 1-3 except that the weight average molecular weight and content of carbon-based compound soluble in the hydrocarbon solvent which a carbon coating film on a surface of the particle of silicon compound contains were varied as shown in Table 6. At this time, the weight average molecular weight and the content of the carbon-based compound were varied by varying a flow rate and a position of an inlet port of a carbon source gas and a flow rate and a position of an inlet port of a carrier gas of the rotary kiln during the thermal decomposition CVD. When the first time charge/discharge characteristics and cycle characteristics of secondary batteries of Example 6-1 to Example 6-11 were investigated, results shown in Table 6 were obtained.

TABLE 6

|  | GPC Average Molecular Weight | Content of Extracted Organics | First Time Efficiency (%) | Capacity Retention Rate (%) |
|---|---|---|---|---|
| Example 6-1 | 840 | 1 | 65.1 | 72.6 |
| Example 6-2 | 810 | 2 | 68.1 | 77.6 |
| Example 6-3 | 320 | 150 | 66.1 | 74.8 |
| Example 6-4 | 220 | 620 | 66.4 | 75.1 |
| Example 6-5 | 400 | 360 | 67.7 | 78.2 |
| Example 1-3 | 840 | 330 | 68.4 | 80.3 |
| Example 6-6 | 1030 | 510 | 68.6 | 79.7 |
| Example 6-7 | 920 | 230 | 68.3 | 80.7 |
| Example 6-8 | 5000 | 260 | 67.5 | 79.0 |
| Example 6-9 | 5100 | 160 | 66.9 | 76.7 |
| Example 6-10 | 880 | 6000 | 67.8 | 78.1 |
| Example 6-11 | 840 | 6500 | 65.3 | 72.8 |

$SiO_x$ (x=0.9), $d_{50}$=5.4 μm, XRD half value width 2θ=1.85, Si (111) crystallite: 4.72 nm, Ib/Ia=1.95, $I_{1330}/I_{1580}$=1.2, C percentage content: 5% by mass, C layer thickness: 100 nm, C layer coverage: 80%, $SiO_2$ particle: spherical, mass fraction of $SiO_2$: 0.75% by mass, composite particle: containing $SiO_x$, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), binder: polyacrylic acid, carboxymethylcellulose, SBR, electrolytic solution: FEC:EC:DMC (1:2:7 vol %), $LiPF_6$ 1.0 mol/kg, positive electrode $LiCoO_2$ As obvious from Table 6, excellent first time efficiency and charge/discharge efficiency were obtained when the weight average molecular weight obtained from the GPC for which the calibration curve was prepared using the polystyrene standard in the hydrocarbon compound contained in the carbon coating film is in the range of 400 or more and 5000 or less. Furthermore, excellent results of the battery characteristics were obtained when the content of the carbon-based compound is in the range of 2 mass ppm or more and 6000 mass ppm or less.

Example 7-1 to Example 7-4

Each secondary battery was produced in the same procedure as in Example 1-3 except that the mass fraction, the layer thickness, and the layer coverage of the carbon contained in a surface of the particle of silicon compound were varied as shown in Table 7. The respective contents were varied by varying a treatment time of the thermal decomposition CVD. When the cycle characteristics and first time charge/discharge characteristics of secondary batteries of Example 7-1 to Example 7-4 were investigated, results shown in Table 7 were obtained.

TABLE 7

|  | C Percentage Content of SiOx (% by mass) | C Layer Thickness of SiOx (nm) | C Film Coverage of SiOx (%) | First Time Efficiency (%) | Capacity Retention Rate (%) |
|---|---|---|---|---|---|
| Example 7-1 | 1.8 | 60 | 60 | 66.4 | 76.7 |
| Example 7-2 | 2.5 | 65 | 72 | 68.0 | 79.0 |
| Example 1-3 | 5.0 | 100 | 80 | 68.4 | 80.3 |
| Example 7-3 | 15 | 220 | 100 | 67.9 | 79.5 |
| Example 7-4 | 30 | 490 | 100 | 67.0 | 76.3 |

$SiO_x$ (x=0.9), $d_{50}$=5.4 μm, XRD half value width 2θ=1.85, Si (111) crystallite: 4.72 nm, Ib/Ia=1.95, $I_{1330}/I_{1580}$=1.2, $SiO_2$ particle: spherical, mass fraction of $SiO_2$: 0.75% by mass, composite particle: containing $SiO_x$, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), $LiPF_6$ 1.0 mol/kg, positive electrode $LiCoO_2$ The first time efficiency and capacity retention rate demonstrated more excellent characteristics when the percentage content of the carbon coating film on a surface of the particle of silicon compound is in the range of 2% by mass or more and 20% by mass or less. The electronic conductivity of the particle of silicon compound becomes excellent when the content of the carbon coating film on a surface of the particle of silicon compound is 2% by mass or more. Furthermore, excellent ionic conductivity was obtained when the content of the carbon coating film on a surface of the particle of silicon compound is 20% by mass or less. Accordingly, excellent values of the capacity retention rate and first time efficiency are obtained when the content of the carbon coating film on a surface of the particle of silicon compound is in the above range.

Example 8-1 to Example 8-6

Each secondary battery was produced in the same procedure as in Example 1-3 except that the ratio of a peak intensity in the vicinity of 28.4° to a peak intensity in the vicinity of 2θ=21.8° Ib/Ia was changed as shown in Table 8. The peak intensity ratio was varied by changing a heat treatment condition under non-atmospheric atmosphere after the thermal decomposition CVD. When the first time charge/discharge characteristics and cycle characteristics of secondary batteries of Example 8-1 to Example 8-6 were investigated, results shown in Table 8 were obtained.

TABLE 8

|  | XRD Ib/Ia | First Time Efficiency (%) | Capacity Retention Rate (%) |
|---|---|---|---|
| Example 8-1 | 0.73 | 69.9 | 75.1 |
| Example 8-2 | 0.84 | 69.1 | 77.3 |
| Example 8-3 | 1.3 | 68.9 | 78.8 |
| Example 1-3 | 1.95 | 68.4 | 80.3 |
| Example 8-4 | 3.01 | 68.1 | 79.4 |
| Example 8-5 | 3.84 | 67.7 | 78.9 |
| Example 8-6 | 4.13 | 66.5 | 76.5 |

$SiO_x$ (x=0.9), $d_{50}$=5.4 μm, XRD half value width 2θ=1.85, Si (111) crystallite: 4.72 nm, $I_{1330}/I_{1580}$=1.2, C percentage content: 5% by mass, C layer thickness: 100 nm, C layer coverage: 80%, $SiO_2$ particle: spherical, mass fraction of $SiO_2$: 0.75% by mass, composite particle: containing $SiO_x$, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As obvious from Table 8, excellent values of the first time efficiency and capacity retention rate were obtained when the range of 0.8≤Ib/Ia≤4.0 is satisfied. This is considered that the negative electrode active material combines appropriate strength, stability and electronic conductivity.

Examples 9-1 to Example 9-8

Each secondary battery was produced in the same procedure as in Example 1-3 except that the crystallinity of a silicon region in the particle of silicon compound was varied. The change of the crystallinity can be controlled by heat treating under non-atmospheric environment after the thermal decomposition CVD. Half value widths of the silicon-based active materials of Examples 9-1 to 9-8 are shown in Table 9. Although the half value width of Example 9-8 is calculated as 20.221°, this is a result obtained by fitting using an analysis soft, and a peak is not substantially obtained. Accordingly, the silicon-based active material of Example 9-8 is said to be substantially amorphous. When the cycle characteristics and first time charge/discharge characteristics of secondary batteries of Example 9-1 to Example 9-8 were investigated, results shown in Table 9 were obtained.

TABLE 9

|  | Half Value Width 2Θ (°) | Si (111) Crystallite Size (nm) | First Time Efficiency (%) | Capacity Retention Rate (%) |
| --- | --- | --- | --- | --- |
| Example 9-1 | 0.756 | 11.42 | 70.9 | 74.2 |
| Example 9-2 | 0.796 | 10.84 | 70.2 | 75.1 |
| Example 9-3 | 1.025 | 8.55 | 69.3 | 76.3 |
| Example 9-4 | 1.218 | 7.21 | 68.7 | 78.7 |
| Example 1-3 | 1.85 | 4.72 | 68.4 | 80.3 |
| Example 9-5 | 2.257 | 3.77 | 68.0 | 80.8 |
| Example 9-6 | 2.593 | 3.29 | 67.7 | 81.2 |
| Example 9-7 | 10.123 | 1.524 | 67.1 | 81.1 |
| Example 9-8 | 20.221 | 0 | 67.0 | 81.7 |

SiO$_x$ (x=0.9), d$_{50}$=5.4 μm, Ib/Ia=1.95, I$_{1330}$/I$_{1580}$=1.2, C percentage content: 5% by mass, C layer thickness: 100 nm, C layer coverage: 80%, SiO$_2$ particle: spherical, mass fraction of SiO$_2$: 0.75% by mass, composite particle: SiO$_x$ contained, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As obvious from Table 9, when the crystallinity of the silicon compound was varied, the capacity retention rate and first time efficiency varied in response to the crystallinities. In particular, high capacity retention rate is obtained in low crystalline materials having a crystallite size of 7.5 nm or less due to the Si (111) plane. In particular, in a non-crystalline region, most excellent capacity retention rate may be obtained.

Example 10-1 to Example 10-6

Each secondary battery was produced in the same procedure as in Example 1-3 except that the median diameter of the particle of silicon compound was adjusted as shown in Table 10. The median diameter was adjusted by varying a crushing time and a classification condition in a production process of the particle of silicon compound. When the first time charge/discharge characteristics and cycle characteristics of secondary batteries of Example 10-1 to Example 10-6 were investigated, results shown in Table 10 were obtained.

TABLE 10

|  | D50 (μm) | First Time Efficiency (%) | Capacity Retention Rate (%) |
| --- | --- | --- | --- |
| Example 10-1 | 0.3 | 64.0 | 73.5 |
| Example 10-2 | 0.5 | 65.0 | 75.5 |
| Example 10-3 | 1.2 | 65.5 | 77.0 |
| Example 1-3 | 5.4 | 68.4 | 80.3 |
| Example 10-4 | 9.8 | 68.0 | 78.7 |
| Example 10-5 | 19.1 | 67.2 | 77.1 |
| Example 10-6 | 21.1 | 66.8 | 74.0 |

SiO$_x$ (x=0.9), XRD half value width 2θ=1.85, Si (111) crystallite: 4.72 nm, Ib/Ia=1.95, I$_{1330}$/I$_{1580}$=1.2, C percentage content: 5% by mass, C layer thickness: 100 nm, C layer coverage: 80%, SiO$_2$ particle: spherical, mass fraction of SiO$_2$: 0.75% by mass, composite particle: SiO$_x$ contained, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC:DMC (1:2:7 vol %), LiPF$_6$ 1.0 mol/kg, positive electrode LiCoO$_2$ As obvious from Table 10, when the median diameter of the particle of silicon compound was varied, in response thereto, the retention rate and first time efficiency varied. As shown in Examples 10-2 to 10-5 and Example 1-3, when the median diameter of the particle of silicon compound is in the range of 0.5 μm to 20 μm, the capacity retention rate and first time efficiency became higher. In particular, in the case where the median diameter is 4 μm to 10 μm (Example 1-3, Example 10-4), a large improvement in the capacity retention rate was found.

Examples 11-1 to 11-5

In Example 11-1 to Example 11-5, each secondary battery was produced fundamentally in the same procedure as in Example 1-3 except that a carbon-based active material (graphite) was further added as the negative electrode active material. Here, a ratio of a content of the carbon-based active material and a content of the particle of silicon compound in the negative electrode was fixed to 90:10 (mass ratio). That is, a ratio of the particle of silicon compound relative to a sum total of the carbon-based active material and the particle of silicon compound was set to 10% by mass. Furthermore, the intensity ratio I$_{1330}$/I$_{1580}$ of scattering peaks of 1330 cm$^{-1}$ and 1580 cm$^{-1}$ in a Raman spectrum analysis was varied as shown in Table 11 by changing a state of the carbon coating film on a surface of the particle of silicon compound by changing a temperature and a gas pressure during the thermal decomposition CVD. When the cycle characteristics and first time charge/discharge characteristics of secondary batteries of Example 11-1 to Example 11-5 were investigated, results shown in Table 11 were obtained.

TABLE 11

| | $I_{1330}/I_{1580}$ | First Time Efficiency (%) | Capacity Retention Rate (%) |
|---|---|---|---|
| Example 11-1 | 0.6 | 79.9 | 82.2 |
| Example 11-2 | 1 | 81.1 | 84.1 |
| Example 11-3 | 1.2 | 81.5 | 84.6 |
| Example 11-4 | 1.9 | 81.2 | 83.9 |
| Example 11-5 | 2.1 | 80.8 | 81.7 |

$SiO_x$ (x=0.9), $d_{50}$=5.4 μm, XRD half value width 2θ=1.85, Si (111) crystallite: 4.72 nm, C percentage content: 5% by mass, C layer thickness: 100 nm, C layer coverage: 80%, $SiO_2$ particle: spherical, mass fraction of $SiO_2$: 0.75% by mass, composite particle: $SiO_x$ contained, particle size of composite particle: 6 μm, L/D=3, mass fraction of composite particle: 1.8% by mass, C percentage content of composite particle: 80 at %, C film coverage of composite particle: 90%, C film thickness of composite particle: 150 nm, TOF-SIMS: (y,z)=({2, 3, 4}, {2y−1, 2y+1, 2y+3}), GPC weight average molecular weight: 840, content of extracted organics: 330 mass ppm, binder: polyacrylic acid, carboxymethylcellulose, SBR, electrolytic solution: FEC:EC: DMC (1:2:7 vol %), $LiPF_6$ 1.0 mol/kg, positive electrode $LiCoO_2$ As is shown in Table 11, the retention rate and first time efficiency can be improved when the $I_{1330}/I_{1580}$ in the Raman spectrum analysis falls below 2.0, because a carbon component having a random bonding form derived from $I_{1330}$ on a surface is not excessive and the electronic conductivity become excellent thereby. Furthermore, the capacity retention rate can be improved when a value of $I_{1330}/I_{1580}$ is larger than 0.7, because a carbon component such as graphite derived from $I_{1580}$ in a surface is not excessive and the ionic conductivity and the followability of the carbon coating film to the expansion accompanying Li insertion into the silicon compound are improved.

By the way, it is to be noted that the present invention is not limited to the foregoing embodiment. The embodiment is just an exemplification, and any of examples that have substantially the same feature and demonstrate the same functions and effects as those in the technical concept described in claims of the present invention are included in the technical scope of the present invention.

The invention claimed is:

1. A negative electrode active material for nonaqueous electrolyte secondary batteries comprising:
a particle of negative electrode active material,
wherein the particle of negative electrode active material contains a particle of a silicon compound containing a silicon compound ($SiO_x$: 0.5≤x≤1.6), on at least a part of a surface of the particle of the silicon compound a carbon coating film being formed, and
the negative electrode active material contains 2% by mass or less and greater than 0% by mass of a particle of silicon dioxide and the negative electrode active material contains a silicon dioxide-carbon composite secondary particle containing a plurality of particles of silicon dioxide and carbon.

2. The negative electrode active material for nonaqueous electrolyte secondary batteries according to claim 1, wherein the composite secondary particle contains the particle of silicon compound.

3. The negative electrode active material for nonaqueous electrolyte secondary batteries according to claim 1, wherein the composite secondary particle has an average particle diameter of 1 μm or more and 15 μm or less.

4. The negative electrode active material for nonaqueous electrolyte secondary batteries according to claim 1, wherein a major diameter L and a minor diameter D of the composite secondary particle satisfy a relationship of 1≤L/D≤5.

5. The negative electrode active material for nonaqueous electrolyte secondary batteries according to claim 1, wherein at least a part of the particles of silicon dioxide that constitute the composite secondary particle is substantially spherical.

6. The negative electrode active material for nonaqueous electrolyte secondary batteries according to claim 1, wherein a ratio of carbon relative to an entirety of the composite secondary particle is 60 at % or more.

7. The negative electrode active material for nonaqueous electrolyte secondary batteries according to claim 1, wherein a coverage of carbon on a surface of the composite secondary particle is 30% or more, and an average film thickness is 30 nm or more.

8. The negative electrode active material for nonaqueous electrolyte secondary batteries according to claim 6, wherein the composite secondary particle is 2% by mass or less relative to a total mass of the negative electrode active material.

9. The negative electrode active material for nonaqueous electrolyte secondary batteries according to claim 1, wherein a carbon coating film formed on a surface of the particle of silicon compound has scattering peaks at 1330 $cm^{-1}$ and 1580 $cm^{-1}$ in a Raman spectrum analysis, and an intensity ratio thereof $I_{1330}/I_{1580}$ satisfies a relationship of 0.7<$I_{1330}/I_{1580}$<2.0.

10. The negative electrode active material for nonaqueous electrolyte secondary batteries according to claim 1, wherein a fragment of a $C_yH_z$-based compound is detected by a TOF-SIMS in the carbon coating film, and, one in which "y" and "z" satisfy the range of 6≥y≥2 and 2y+2≥z≥2y−2 is detected in at least a part of the carbon coating film as the fragment of the $C_yH_z$-based compound.

11. The negative electrode active material for nonaqueous electrolyte secondary batteries according to claim 1, wherein the carbon coating film has a weight average molecular weight measured by a gel permeation chromatography using a polystyrene standard of 400 or more and 5000 or less, and contains a carbon-based compound soluble in a hydrocarbon solvent, and has a content of the carbon-based compound of 2 mass ppm or more and 6000 mass ppm or less relative to a total mass of the particle of the silicon compound.

12. The negative electrode active material for nonaqueous electrolyte secondary batteries according to claim 1, wherein a percentage content of the carbon coating film is 2% by mass or more and 20% by mass or less relative to a total mass of the particle of silicon compound and the carbon coating film.

13. The negative electrode active material for nonaqueous electrolyte secondary batteries according to claim 1, wherein a relationship between an intensity (Ia) of a peak in the vicinity of 2θ=21.8° and an intensity (Ib) of a peak in the vicinity of 2θ=28.4° in an X-ray diffraction spectrum is 0.8≤Ib/Ia≤4.0.

14. The negative electrode active material for nonaqueous electrolyte secondary batteries according to claim 1, wherein the particle of silicon compound has a half value width (2θ) of a diffraction peak attributable to a Si(111) crystal plane obtained by X-ray diffractometry of 1.2° or more and a crystallite size corresponding to the crystal plane of 7.5 nm or less.

15. The negative electrode active material for nonaqueous electrolyte secondary batteries according to claim 1, wherein a median diameter of the particle of silicon compound is 0.5 µm or more and 20 µm or less.

16. A negative electrode for nonaqueous electrolyte secondary batteries comprising:
the negative electrode active material for nonaqueous electrolyte secondary batteries according to claim 1; and
a carbon-based active material.

17. The negative electrode for nonaqueous electrolyte secondary batteries according to claim 16, wherein a ratio of the particle of silicon compound relative to a sum total of the carbon-based active material and the particle of the silicon compound is 4% by mass or more.

18. A nonaqueous electrolyte secondary battery, wherein the nonauqeous electrolyte second battery uses the negative electrode for nonaqueous electrolyte secondary batteries according to claim 16.

19. A production method of a negative electrode active material for nonaqueous electrolyte secondary batteries having a particle of negative electrode active material, the production method comprising:
producing a negative electrode active material, the producing the negative electrode active material including
preparing a particle of silicon compound containing a silicon compound expressed by a general formula ($SiO_x$: $0.5 \leq x \leq 1.6$),
coating at least a part of a surface of the particle of silicon compound with a carbon coating film, and
forming a silicon dioxide-carbon composite secondary particle containing a plurality of particles of silicon dioxide and carbon; and
selecting negative electrode active material that contain 2% by mass or less and greater than 0% by mass of a particle of silicon dioxide and the silicon dioxide-carbon composite secondary particle from the produced negative electrode active material.

20. The production method of a negative electrode active material for nonaqueous electrolyte secondary batteries according to claim 19, wherein
the step of coating at least a part of a surface of the particle of silicon compound with a carbon coating film, and the step of forming the silicon dioxide-carbon composite secondary particle are carried out in a continuous furnace, and
the continuous furnace is a rotary kiln that heats/decomposes a carbon source gas while mixing/stirring the negative electrode active material in the inside by rotation of a furnace tube.

* * * * *